United States Patent
Ogrinz

(10) Patent No.: US 10,039,113 B2
(45) Date of Patent: Jul. 31, 2018

(54) INTELLIGENT RESOURCE PROCUREMENT SYSTEM BASED ON PHYSICAL PROXIMITY TO RELATED RESOURCES

(71) Applicant: Bank of America Corporation, Charlotte, NC (US)

(72) Inventor: Michael Emil Ogrinz, Easton, CT (US)

(73) Assignee: Bank of America Corporation, Charlotte, NC (US)

(*) Notice: Subject to any disclaimer, the term of this patent is extended or adjusted under 35 U.S.C. 154(b) by 274 days.

(21) Appl. No.: 15/082,659

(22) Filed: Mar. 28, 2016

(65) Prior Publication Data
US 2017/0280459 A1 Sep. 28, 2017

(51) Int. Cl.
*G06F 15/173* (2006.01)
*H04W 72/04* (2009.01)
(Continued)

(52) U.S. Cl.
CPC ....... *H04W 72/0493* (2013.01); *H04L 63/083* (2013.01); *H04L 63/0861* (2013.01);
(Continued)

(58) Field of Classification Search
CPC . H04W 72/0493; H04W 4/023; H04W 24/08; H04W 76/10; H04W 76/02; H04L 63/083; H04L 63/0861; H04L 63/0876
(Continued)

(56) References Cited

U.S. PATENT DOCUMENTS 5,717,923 A 2/1998 Dedrick
5,761,648 A 6/1998 Golden et al.
(Continued)

FOREIGN PATENT DOCUMENTS

CN 104283967 A 1/2015

OTHER PUBLICATIONS

Friedman, Jack P., Dictionary of Business Terms, 2000, Barron's Educational Series, Inc., 3rd edition, 225.
(Continued)

*Primary Examiner* — Hamza N Algibhah
*Assistant Examiner* — Hannah S Wang
(74) *Attorney, Agent, or Firm* — Michael A. Springs; Moore & Van Allen PLLC; Peter B. Stewart

(57) ABSTRACT

Disclosed is an intelligent resource procurement system. The system typically includes a processor, a memory, and a resource management module stored in the memory. The system is typically configured for: identifying a resource deficiency associated with an entity; establishing a secure communication channel with a portable electronic device associated with the entity; monitoring a location of the portable electronic device over the secure communication channel; receiving a usage profile for each of a plurality of smart devices related to the resource deficiency; parsing the usage profiles to extract aggregate usage information; identifying a custodian of each of the plurality of smart devices; determining that the portable electronic device is located proximate to a first smart device of the plurality of smart devices and the custodian of the first smart device; and transmitting instructions causing the portable electronic device to display resource procurement information related to the resource deficiency.

15 Claims, 7 Drawing Sheets

(51) Int. Cl.
  *H04W 4/02* (2018.01)
  *H04W 24/08* (2009.01)
  *H04L 29/06* (2006.01)
  *H04W 76/10* (2018.01)

(52) U.S. Cl.
  CPC ......... *H04L 63/0876* (2013.01); *H04W 4/023* (2013.01); *H04W 24/08* (2013.01); *H04W 76/10* (2018.02)

(58) Field of Classification Search
  USPC ........................................................ 709/226
  See application file for complete search history.

(56) References Cited

U.S. PATENT DOCUMENTS

| | | |
|---|---|---|
| 5,842,185 A | 11/1998 | Chancey et al. |
| 5,848,396 A | 12/1998 | Gerace |
| 5,870,770 A | 2/1999 | Wolfe |
| 5,907,830 A | 5/1999 | Engel et al. |
| 5,911,135 A | 6/1999 | Atkins |
| 5,933,811 A | 8/1999 | Angles et al. |
| 6,006,252 A | 12/1999 | Wolfe |
| 6,009,411 A | 12/1999 | Kepecs |
| 6,009,413 A | 12/1999 | Webber et al. |
| 6,041,309 A | 3/2000 | Laor |
| 6,055,573 A | 4/2000 | Gardenswartz et al. |
| 6,076,069 A | 6/2000 | Laor |
| 6,223,163 B1 | 4/2001 | Van Luchene |
| 6,263,351 B1 | 7/2001 | Wolfe |
| 6,282,567 B1 | 8/2001 | Finch, II et al. |
| 6,292,786 B1 | 9/2001 | Deaton et al. |
| 6,292,813 B1 | 9/2001 | Wolfe |
| 6,317,718 B1 | 11/2001 | Fano |
| 6,321,208 B1 | 11/2001 | Barnett et al. |
| 6,330,543 B1 | 12/2001 | Kepecs |
| 6,332,126 B1 | 12/2001 | Peirce et al. |
| 6,336,099 B1 | 1/2002 | Barnett et al. |
| 6,336,131 B1 | 1/2002 | Wolfe |
| 6,341,305 B2 | 1/2002 | Wolfe |
| 6,349,290 B1 | 2/2002 | Horowitz et al. |
| 6,385,592 B1 | 5/2002 | Angles et al. |
| 6,434,534 B1 | 8/2002 | Walker et al. |
| 6,505,168 B1 | 1/2003 | Rothman et al. |
| 6,611,814 B1 | 8/2003 | Lee et al. |
| 6,615,184 B1 | 9/2003 | Hicks |
| 6,622,174 B1 | 9/2003 | Ukita et al. |
| 6,678,685 B2 | 1/2004 | McGill et al. |
| 6,782,370 B1 | 8/2004 | Stack |
| 6,865,545 B1 | 3/2005 | Epstein et al. |
| 6,925,444 B1 | 8/2005 | McCollom et al. |
| 6,937,995 B1 | 8/2005 | Kepecs |
| 7,024,374 B1 | 4/2006 | Day et al. |
| 7,043,526 B1 | 5/2006 | Wolfe |
| 7,096,193 B1 | 8/2006 | Beaudoin et al. |
| 7,099,832 B2 | 8/2006 | Walker et al. |
| 7,124,096 B2 | 10/2006 | Dutta et al. |
| 7,127,414 B1 | 10/2006 | Awadallah et al. |
| 7,162,443 B2 | 1/2007 | Shah |
| 7,181,488 B2 | 2/2007 | Martin et al. |
| 7,225,167 B2 | 5/2007 | Hind et al. |
| 7,231,357 B1 | 6/2007 | Shanman et al. |
| 7,236,942 B1 | 6/2007 | Walker et al. |
| 7,246,310 B1 | 7/2007 | Wolfe |
| 7,249,058 B2 | 7/2007 | Kim et al. |
| 7,254,548 B1 | 8/2007 | Tannenbaum |
| 7,257,604 B1 | 8/2007 | Wolfe |
| 7,299,007 B2 | 11/2007 | Eskin |
| 7,302,429 B1 | 11/2007 | Wanker |
| 7,302,638 B1 | 11/2007 | Wolfe |
| 7,315,834 B2 | 1/2008 | Martineau et al. |
| 7,324,965 B2 | 1/2008 | Martineau et al. |
| 7,340,419 B2 | 3/2008 | Walker et al. |
| 7,356,490 B1 | 4/2008 | Jacobi et al. |
| 7,386,477 B2 | 6/2008 | Fano |
| 7,398,248 B2 | 7/2008 | Phillips et al. |
| 7,433,874 B1 | 10/2008 | Wolfe |
| 7,464,050 B1 | 12/2008 | Deaton et al. |
| 7,472,088 B2 | 12/2008 | Taylor et al. |
| 7,490,056 B2 | 2/2009 | Nash |
| 7,512,551 B2 | 3/2009 | Postrel |
| 7,536,385 B1 | 5/2009 | Wolfe |
| 7,552,080 B1 | 6/2009 | Willard et al. |
| 7,578,435 B2 | 8/2009 | Suk |
| 7,593,862 B2 | 9/2009 | Mankoff |
| 7,599,850 B1 | 10/2009 | Laor |
| 7,606,736 B2 | 10/2009 | Martineau et al. |
| 7,860,792 B1 | 12/2010 | Magruder et al. |
| 7,925,579 B1 | 4/2011 | Flaxman et al. |
| 8,042,178 B1 | 10/2011 | Fisher et al. |
| 8,234,194 B2 | 7/2012 | Mele et al. |
| 8,301,558 B2 | 10/2012 | Marshall et al. |
| 8,442,894 B2 | 5/2013 | Blackhurst et al. |
| 8,495,072 B1 | 7/2013 | Kapoor et al. |
| 8,930,265 B2 | 1/2015 | Blackhurst et al. |
| 8,984,113 B2 | 3/2015 | Li et al. |
| 9,009,828 B1 | 4/2015 | Ramsey et al. |
| 9,032,077 B1 | 5/2015 | Klein et al. |
| 9,043,879 B1 | 5/2015 | Reeves et al. |
| 9,106,615 B2 | 8/2015 | Grossman |
| 9,338,181 B1 | 5/2016 | Burns et al. |
| 9,411,982 B1 | 8/2016 | Dippenaar et al. |
| 9,775,131 B2 | 9/2017 | Winand et al. |
| 9,843,624 B1 | 12/2017 | Taaghol et al. |
| 2002/0032626 A1 | 3/2002 | DeWolf et al. |
| 2002/0049624 A1 | 4/2002 | Raveis, Jr. |
| 2002/0052803 A1 | 5/2002 | Amidhozour et al. |
| 2002/0062249 A1 | 5/2002 | Iannacci |
| 2002/0072975 A1 | 6/2002 | Steele et al. |
| 2002/0091571 A1 | 7/2002 | Thomas et al. |
| 2002/0114433 A1 | 8/2002 | Katou et al. |
| 2002/0143564 A1 | 10/2002 | Webb et al. |
| 2002/0190118 A1 | 12/2002 | Davenport et al. |
| 2004/0122736 A1 | 6/2004 | Strock et al. |
| 2004/0192339 A1 | 9/2004 | Wilson et al. |
| 2004/0226995 A1 | 11/2004 | Smith |
| 2004/0230593 A1 | 11/2004 | Rudin et al. |
| 2004/0249768 A1 | 12/2004 | Kontio et al. |
| 2005/0015624 A1 | 1/2005 | Ginter et al. |
| 2005/0039053 A1 | 2/2005 | Walia |
| 2005/0075975 A1 | 4/2005 | Rosner et al. |
| 2005/0171845 A1 | 8/2005 | Halfman et al. |
| 2005/0173517 A1 | 8/2005 | Suk et al. |
| 2005/0177437 A1 | 8/2005 | Ferrier |
| 2005/0221842 A1 | 10/2005 | Kaneko et al. |
| 2005/0286079 A1 | 12/2005 | Takagi |
| 2005/0288955 A1 | 12/2005 | Lewiss-Hachmeister |
| 2006/0151598 A1 | 7/2006 | Chen et al. |
| 2006/0217113 A1 | 9/2006 | Rao et al. |
| 2007/0005426 A1 | 1/2007 | Walker et al. |
| 2007/0092114 A1 | 4/2007 | Ritter et al. |
| 2007/0127470 A1 | 6/2007 | Gaedeken et al. |
| 2007/0136418 A1 | 6/2007 | Wolfe |
| 2007/0255620 A1 | 11/2007 | Tumminaro et al. |
| 2007/0260532 A1 | 11/2007 | Blake, III |
| 2007/0299677 A1 | 12/2007 | Maertz |
| 2008/0009268 A1 | 1/2008 | Ramer et al. |
| 2008/0021767 A1 | 1/2008 | Benson et al. |
| 2008/0040417 A1 | 2/2008 | Juncker |
| 2008/0091535 A1 | 4/2008 | Heiser et al. |
| 2008/0133336 A1 | 6/2008 | Altman et al. |
| 2008/0162224 A1 | 7/2008 | Coon et al. |
| 2008/0162316 A1 | 7/2008 | Rampell et al. |
| 2008/0192677 A1 | 8/2008 | Abusch-Magder et al. |
| 2008/0221986 A1 | 9/2008 | Soicher et al. |
| 2008/0228600 A1 | 9/2008 | Treyz et al. |
| 2008/0235130 A1 | 9/2008 | Malov et al. |
| 2008/0249936 A1 | 10/2008 | Miller et al. |
| 2008/0249941 A1 | 10/2008 | Cooper |
| 2008/0277465 A1 | 11/2008 | Pletz et al. |
| 2008/0301779 A1 | 12/2008 | Garg et al. |
| 2009/0006175 A1 | 1/2009 | Maertz |
| 2009/0043629 A1 | 2/2009 | Price |
| 2009/0094125 A1 | 4/2009 | Killian et al. |

(56) References Cited

U.S. PATENT DOCUMENTS

| | | |
|---|---|---|
| 2009/0132366 A1 | 5/2009 | Lam et al. |
| 2009/0132415 A1 | 5/2009 | Davis et al. |
| 2009/0150238 A1 | 6/2009 | Marsh et al. |
| 2009/0170483 A1 | 7/2009 | Barnett et al. |
| 2009/0172728 A1 | 7/2009 | Shkedi et al. |
| 2009/0187436 A1 | 7/2009 | Shoen et al. |
| 2009/0187543 A1 | 7/2009 | Samborn |
| 2009/0271265 A1 | 10/2009 | Lay |
| 2009/0292599 A1 | 11/2009 | Rampell et al. |
| 2009/0292647 A1 | 11/2009 | Porat et al. |
| 2009/0299865 A1 | 12/2009 | Budgen |
| 2009/0313106 A1 | 12/2009 | Taylor et al. |
| 2009/0319638 A1 | 12/2009 | Faith et al. |
| 2010/0106568 A1 | 4/2010 | Grimes |
| 2010/0131395 A1 | 5/2010 | Allin et al. |
| 2010/0189227 A1 | 7/2010 | Mannar et al. |
| 2010/0274731 A1 | 10/2010 | Tsitsis |
| 2010/0306763 A1 | 12/2010 | Lambert et al. |
| 2011/0087547 A1 | 4/2011 | Amaro et al. |
| 2011/0182280 A1 | 7/2011 | Charbit |
| 2011/0191149 A1 | 8/2011 | Blackhurst et al. |
| 2011/0191150 A1 | 8/2011 | Blackhurst et al. |
| 2011/0191160 A1 | 8/2011 | Blackhurst et al. |
| 2011/0191173 A1 | 8/2011 | Blackhurst et al. |
| 2011/0191177 A1 | 8/2011 | Blackhurst et al. |
| 2011/0191180 A1 | 8/2011 | Blackhurst et al. |
| 2011/0191181 A1 | 8/2011 | Blackhurst et al. |
| 2011/0191184 A1 | 8/2011 | Blackhurst et al. |
| 2011/0191238 A1 | 8/2011 | Blackhurst et al. |
| 2011/0238499 A1 | 9/2011 | Blackhurst et al. |
| 2011/0238550 A1 | 9/2011 | Reich et al. |
| 2011/0270773 A1 | 11/2011 | Siekman et al. |
| 2011/0302201 A1 | 12/2011 | Ogaz et al. |
| 2012/0028635 A1 | 2/2012 | Borg et al. |
| 2012/0030092 A1 | 2/2012 | Marshall et al. |
| 2012/0190386 A1 | 7/2012 | Anderson |
| 2013/0132854 A1 | 5/2013 | Raleigh et al. |
| 2013/0185558 A1 | 7/2013 | Seibert et al. |
| 2013/0298242 A1 | 11/2013 | Kumar et al. |
| 2014/0006529 A1 | 1/2014 | Andreoli-Fang et al. |
| 2014/0047322 A1 | 2/2014 | Kim et al. |
| 2014/0068721 A1 | 3/2014 | Ong et al. |
| 2014/0115324 A1 | 4/2014 | Buer |
| 2014/0226010 A1 | 8/2014 | Molin et al. |
| 2014/0244834 A1 | 8/2014 | Guedalia et al. |
| 2014/0278629 A1* | 9/2014 | Stephenson ........ G06Q 10/1091 705/7.13 |
| 2014/0344128 A1 | 11/2014 | Nikankin et al. |
| 2015/0002271 A1* | 1/2015 | Lee ................ G01S 5/0221 340/10.1 |
| 2015/0081860 A1 | 3/2015 | Kuehnel et al. |
| 2015/0094026 A1 | 4/2015 | Martin |
| 2015/0094093 A1 | 4/2015 | Pierce et al. |
| 2015/0221039 A1 | 8/2015 | Johansson |
| 2015/0227406 A1 | 8/2015 | Jan et al. |
| 2015/0293574 A1 | 10/2015 | Ehsan |
| 2015/0312348 A1 | 10/2015 | Lustgarten |
| 2015/0327071 A1 | 11/2015 | Sharma et al. |
| 2015/0358317 A1 | 12/2015 | Deutschman et al. |
| 2016/0065628 A1* | 3/2016 | Guo et al. ............ H04L 65/403 709/204 |
| 2016/0071334 A1 | 3/2016 | Johnson et al. |
| 2016/0087933 A1 | 3/2016 | Johnson et al. |
| 2016/0110811 A1 | 4/2016 | Siu et al. |
| 2016/0132832 A1* | 5/2016 | Pinkovezky ............ H04W 4/21 705/319 |
| 2016/0164919 A1 | 6/2016 | Satish et al. |
| 2016/0210450 A1 | 7/2016 | Su |
| 2016/0217282 A1 | 7/2016 | Vecera et al. |
| 2016/0232336 A1 | 8/2016 | Pitschel et al. |
| 2016/0269411 A1 | 9/2016 | Malachi |
| 2016/0295410 A1 | 10/2016 | Gupta et al. |
| 2016/0300201 A1 | 10/2016 | Li et al. |
| 2016/0337869 A1 | 11/2016 | Dai |
| 2016/0342982 A1 | 11/2016 | Thomas et al. |
| 2016/0343078 A1 | 11/2016 | Vaidyanathan et al. |
| 2016/0367415 A1* | 12/2016 | Hayes ................. A61G 1/0281 |
| 2017/0041296 A1 | 2/2017 | Ford et al. |
| 2017/0061442 A1* | 3/2017 | Barlow ................ G06Q 30/016 |
| 2017/0076408 A1 | 3/2017 | D'Souza et al. |
| 2017/0124642 A1 | 5/2017 | Barnett et al. |
| 2017/0171513 A1 | 6/2017 | Nakamura |
| 2017/0208079 A1 | 7/2017 | Cammarota et al. |
| 2017/0228773 A1 | 8/2017 | Takayama |
| 2017/0244618 A1 | 8/2017 | DeLuca et al. |
| 2017/0323345 A1 | 11/2017 | Flowers et al. |
| 2017/0352071 A1 | 12/2017 | Carey et al. |
| 2017/0353859 A1 | 12/2017 | Idnani et al. |

OTHER PUBLICATIONS

Guagliardo, Joseph C. et al., "Blockchain: Preparing for Disruption Like Its the 90s"; Mar. 14, 2016, retrieved from http://www.law360.com/articles/77120CVprint?section=ip.

International Preliminary Report on Patentability (IPRP) dated Jul. 31, 2012 for International Application No. PCT/US2011/022765.

International Search Report and the Written Opinion of the International Searching Authority dated Mar. 25, 2011 for International Application No. PCT/US11/22781.

International Search Report and the Written Opinion of the International Searching Authority dated Mar. 25, 2011 for International Application No. PCT/US11/22783.

International Search Report and the Written Opinion of the International Searching Authority dated Mar. 28, 2011 for International Application No. PCT/US11/22771.

International Search Report and the Written Opinion of the International Searching Authority dated Mar. 29, 2011 for International Application No. PCT/US11/22779.

International Search Report and the Written Opinion of the International Searching Authority dated Mar. 29, 2011 for International Application No. PCT/US11/22785.

International Search Report and the Written Opinion of the International Searching Authority dated Apr. 8, 2011 for International Application No. PCT/US11/22765.

\* cited by examiner

INTELLIGENT RESOURCE PROCUREMENT SYSTEM BASED ON PHYSICAL PROXIMITY TO RELATED RESOURCES

FIELD OF THE INVENTION

The present invention embraces an intelligent resource procurement system that includes a processor, a memory, and a resource management module stored in the memory. The system is typically configured for: identifying a resource deficiency; establishing a secure communication channel with a portable electronic device; monitoring a location of the portable electronic device over the secure communication channel; determining that the portable electronic device is located proximate to a smart device related to the resource deficiency; and transmitting instructions causing the portable electronic device to display resource procurement information related to the resource deficiency.

BACKGROUND

Systems for providing communications between and amongst devices are known where interconnected devices, often referred to as smart devices, may include communications modules, processors and applications that allow the devices to communicate with one another, and with other devices and/or systems, over a network. Such systems allow the devices to collect and exchange data and are commonly referred to as the internet-of-things.

SUMMARY

In one aspect, the present invention embraces a computerized system, and an associated method and computer program product, for providing intelligent resource procurement. The system typically includes a processor and a memory. The system also typically includes a resource management module stored in the memory and executable by the processor. In one embodiment, the resource management module is configured for: identifying a resource deficiency associated with an entity; establishing a secure communication channel with a portable electronic device associated with the entity; monitoring a location of the portable electronic device over the secure communication channel; receiving, via the network communication device, a usage profile for each of a plurality of smart devices related to the resource deficiency; parsing the usage profiles to extract aggregate usage information; identifying a custodian of each of the plurality of smart devices; determining that the portable electronic device is located proximate to (i) a first smart device of the plurality of smart devices and (ii) the custodian of the first smart device; and based on determining that the portable electronic device is located proximate to (i) the first smart device and (ii) the custodian of the first smart device, transmitting instructions over the secure communication channel to the portable electronic device, the instructions causing the portable electronic device to display resource procurement information related to the resource deficiency, the resource procurement information comprising the aggregate usage information.

In a particular embodiment, the resource management module is configured for: receiving, via the network communication device, a usage profile of a current smart device of the entity; and analyzing the usage profile of the current smart device to identify the resource deficiency. Analyzing the usage profile of the current smart device to identify the resource deficiency may comprises identifying data in the usage profile of the current smart device associated with a failure condition.

In another particular embodiment, the custodian of the first smart device is identified based on comparing (i) location information associated with the custodian of the first smart device with (ii) location information associated with first smart device.

In yet another particular embodiment, the resource management module is configured for determining that the custodian of the first smart device is a trusted custodian, and transmitting instructions over the secure communication channel to the portable electronic device is further based on determining that the custodian of the first smart device is a trusted custodian. Determining that the custodian of the first smart device is a trusted custodian is based on determining a social network relationship between the custodian of the first smart device and the entity. Alternatively, determining that the custodian of the first smart device is a trusted custodian is based on comparing (i) location information associated with the entity with (ii) location information associated with the custodian of the first smart device.

In yet another particular embodiment, the resource procurement information comprises a recommendation that the entity procure a new smart device. The new smart device and the plurality of smart devices may be a same type of smart device.

In yet another particular embodiment, the instructions cause the portable electronic device to display a graphical user interface, the graphical user interface being configured to display a selectable offer to procure a new smart device. In addition, the resource management module may be configured for receiving an acceptance of the offer from the portable electronic device; and procuring the new smart device for the entity.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
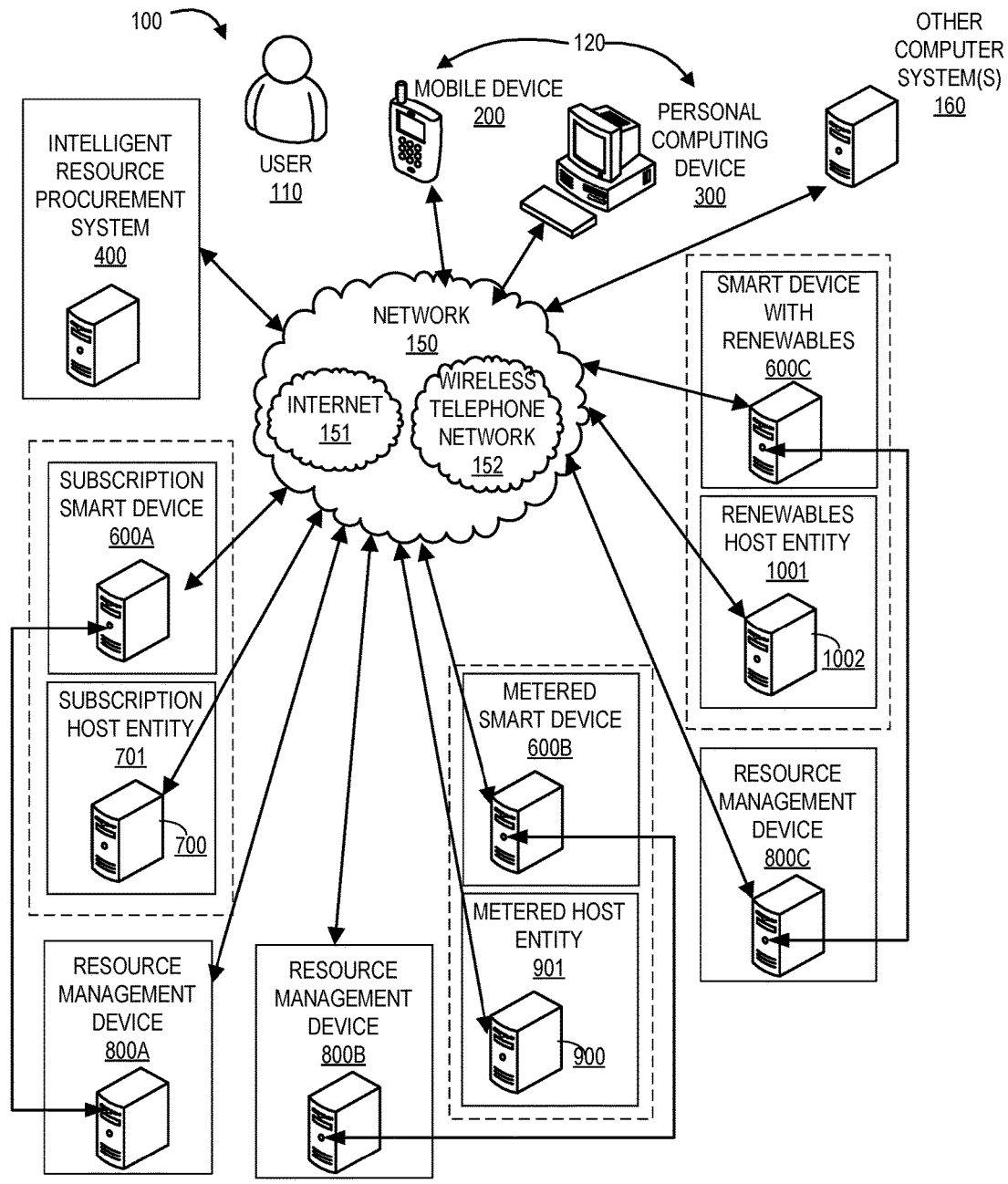
Figure 2:
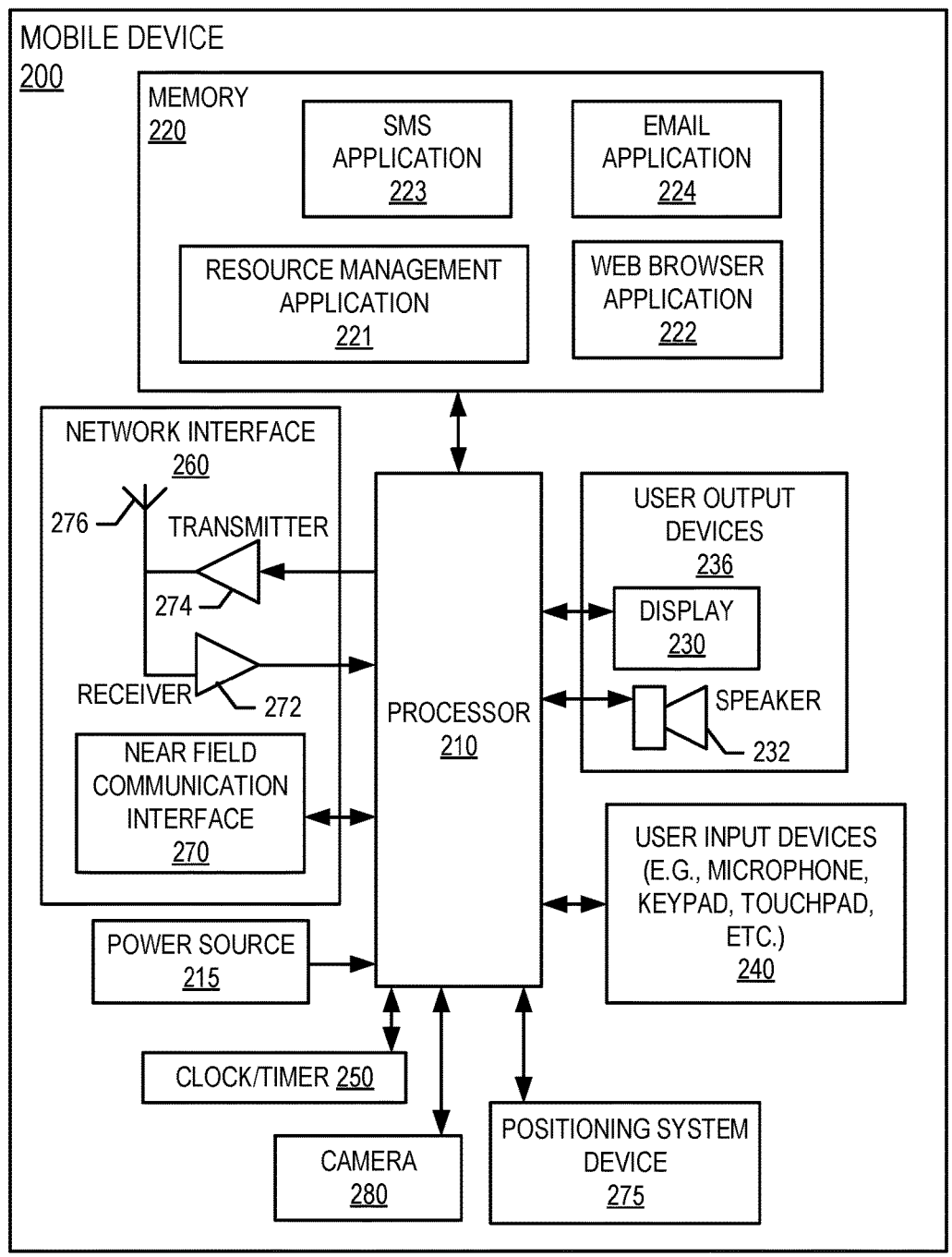
Figure 3:
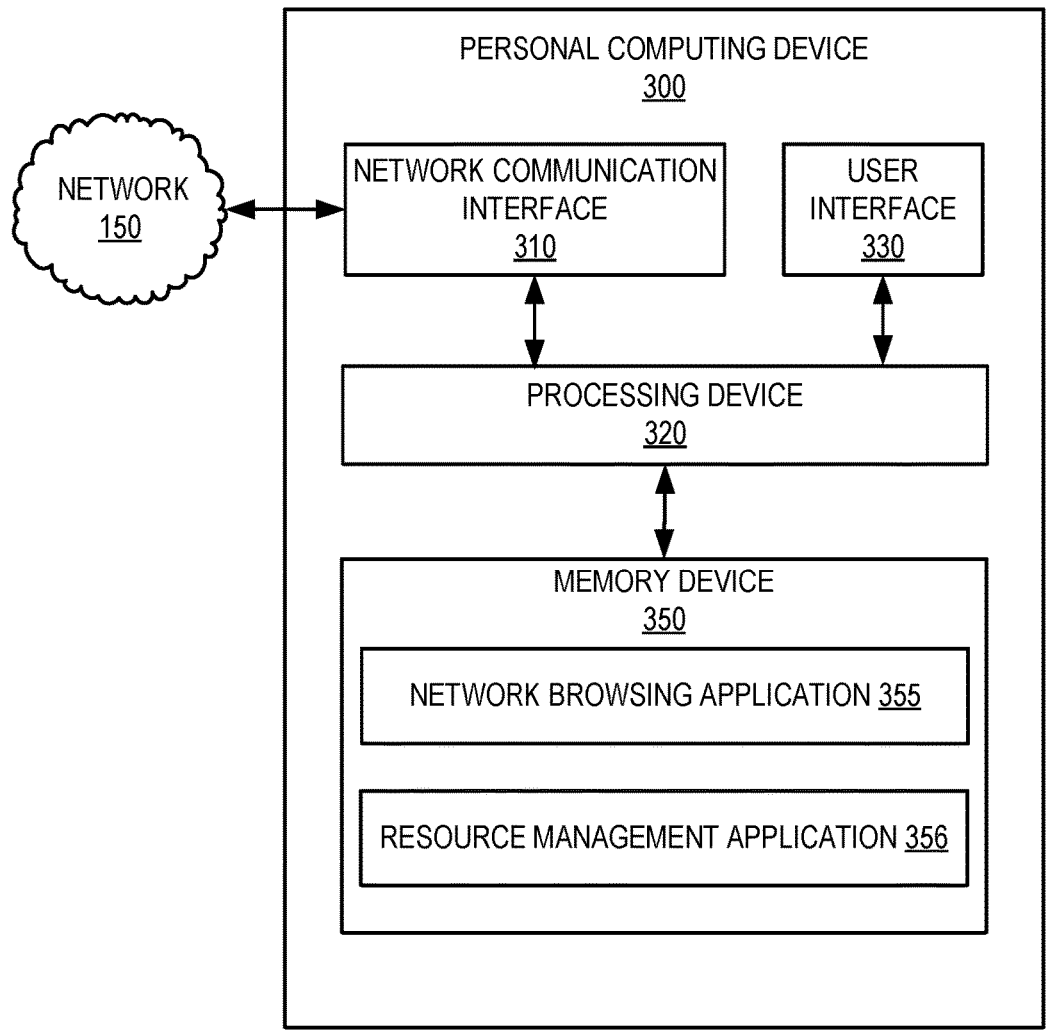
Figure 4:
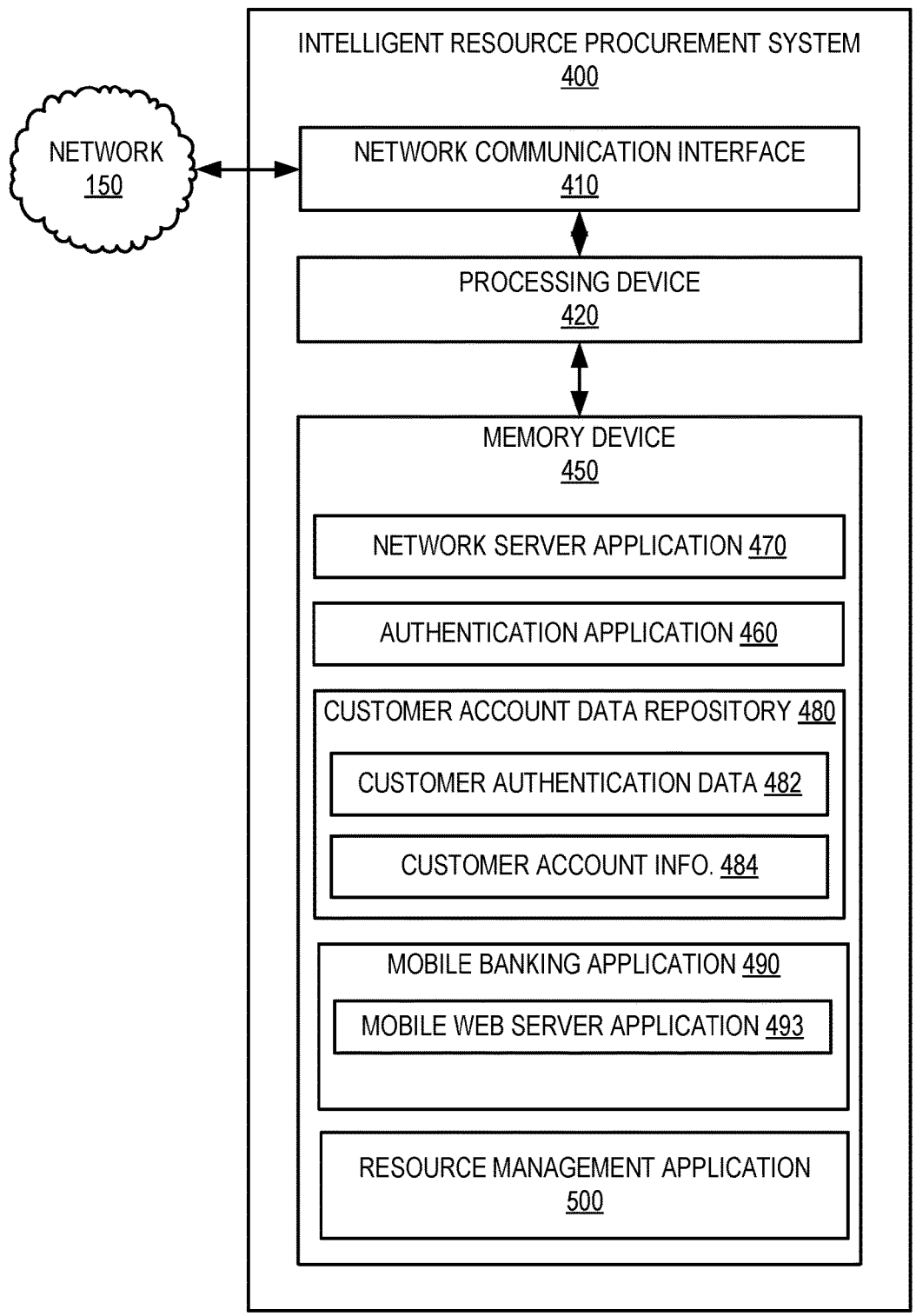
Figure 5:
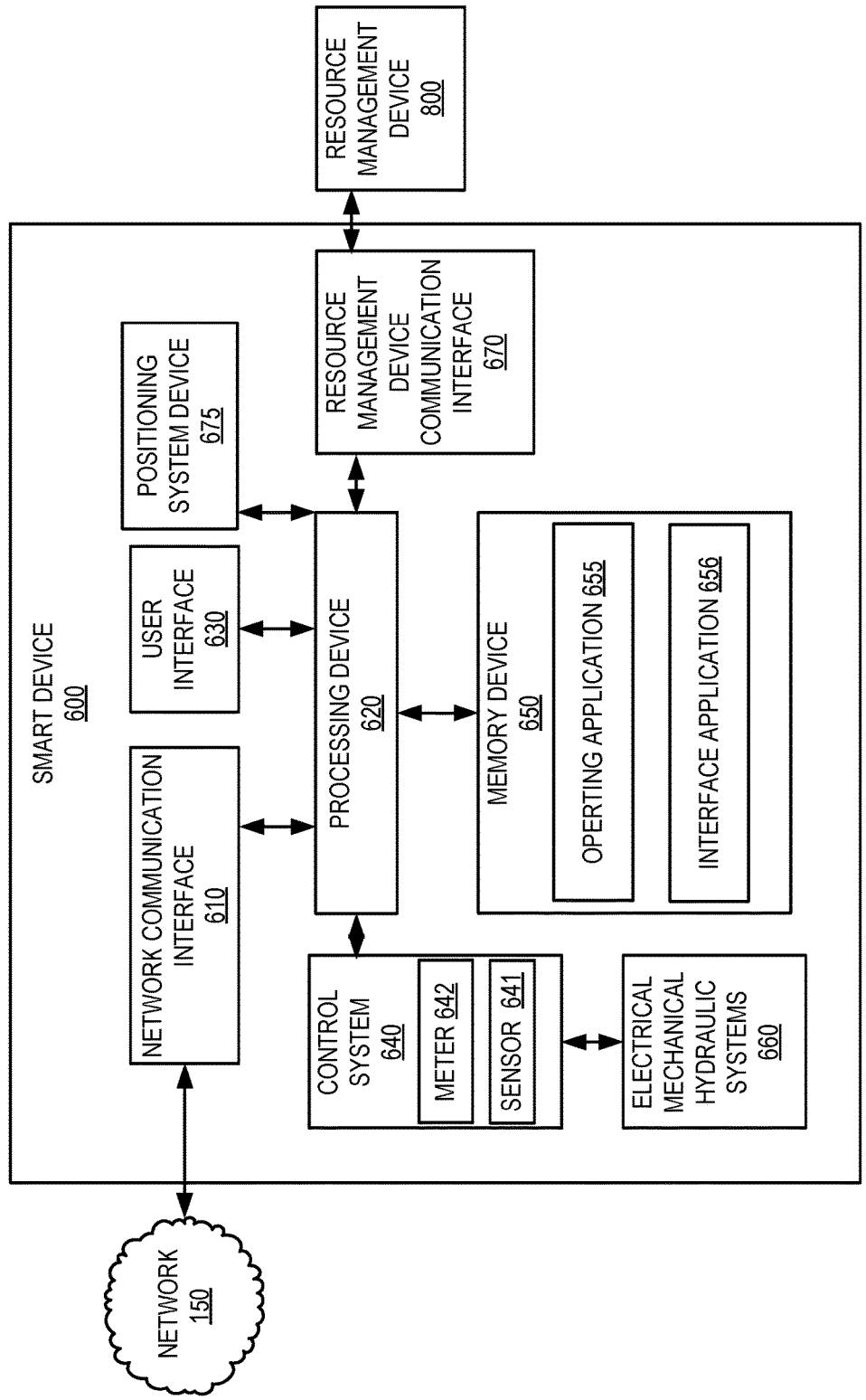
Figure 6:
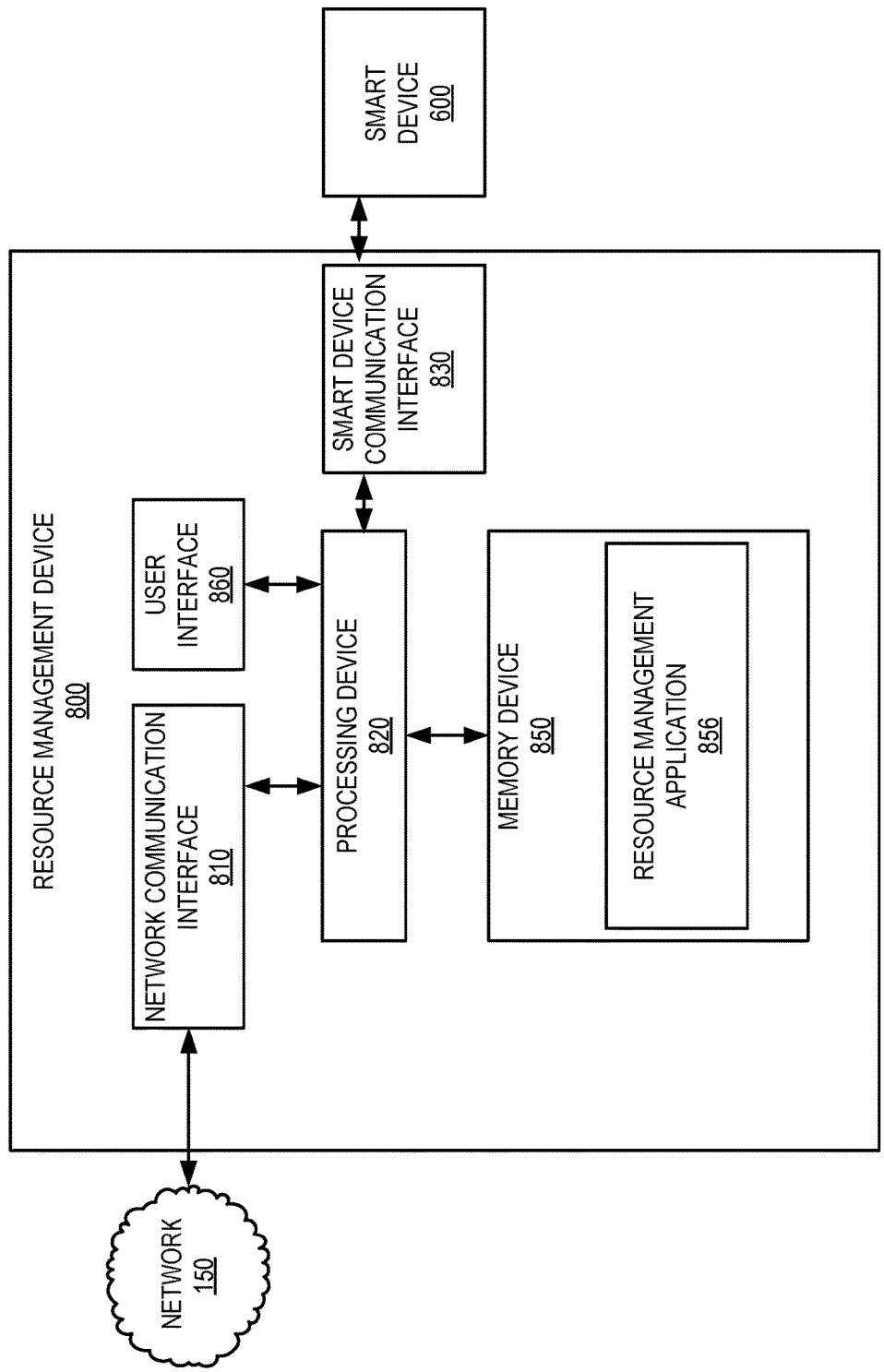
Figure 7:
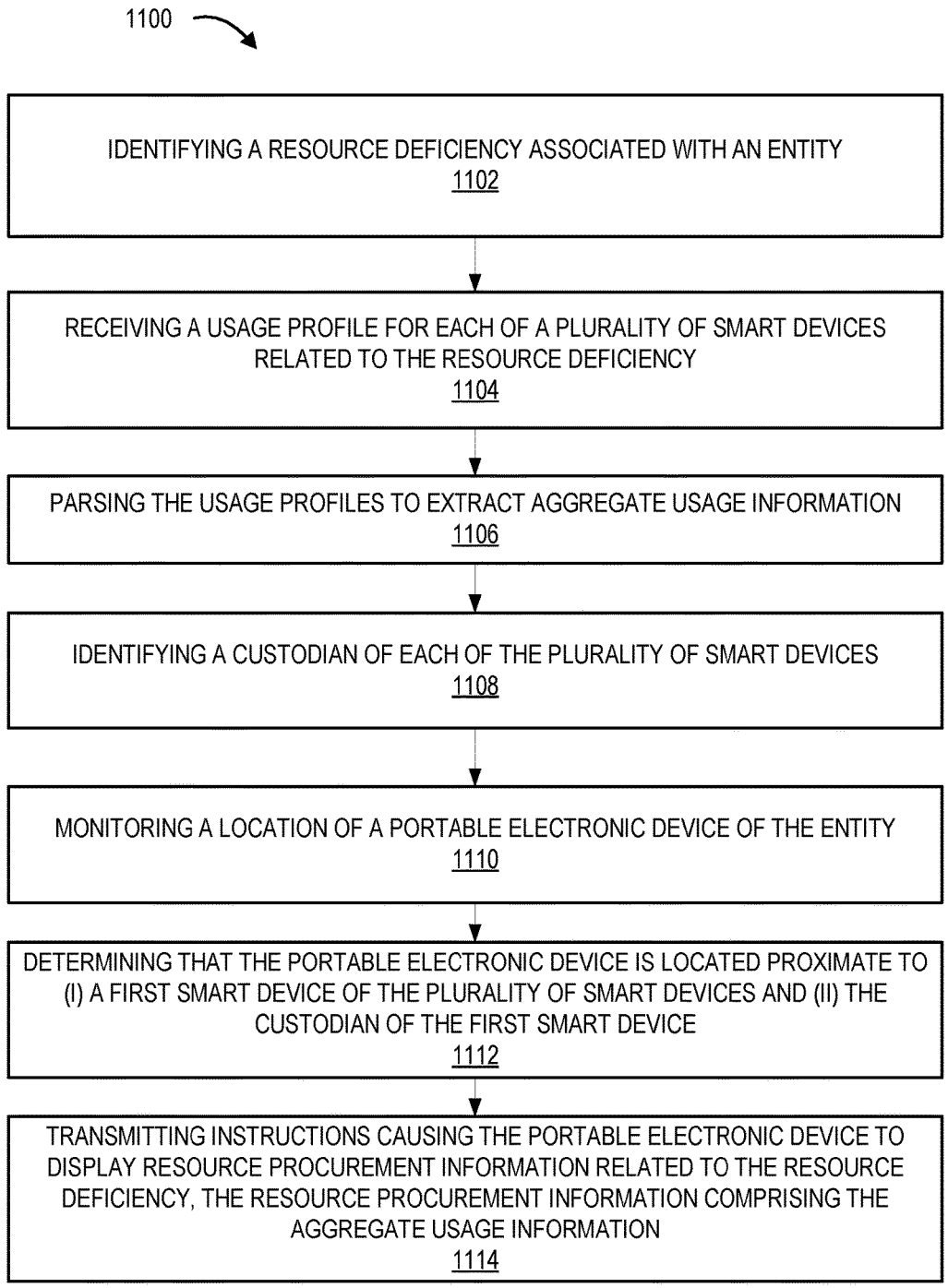

Having thus described embodiments of the invention in general terms, reference will now be made the accompanying drawings, wherein:

FIG. 1 depicts an intelligent resource procurement system and operating environment in accordance with an exemplary embodiment of the present invention;

FIG. 2 schematically depicts a mobile device in accordance with an exemplary embodiment of the present invention;

FIG. 3 schematically depicts a personal computing device in accordance with an exemplary embodiment of the present invention;

FIG. 4 schematically depicts an intelligent resource procurement system in accordance with an exemplary embodiment of the present invention;

FIG. 5 schematically depicts a smart device in accordance with an exemplary embodiment of the present invention;

FIG. 6 schematically depicts a resource management device in accordance with an exemplary embodiment of the present invention;

FIG. 7 depicts a method of providing intelligent resource procurement in accordance with an exemplary embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Many of the example implementations discussed and contemplated herein involve at least one "smart device". A "smart device" as used herein means a device, apparatus and/or system that is capable of communicating with and transmitting information or data to and/or receiving information or data from other devices, systems or apparatuses including over a network. The smart device may be for example, but not limited to, a machine such as an automobile, tractor trailer, airplane, manufacturing device, warehouse devices, material handling system, conveyor system, robotics or the like; appliances such as refrigerators, washer/dryers, dish washers, or the like; home entertainment devices or systems such as set top boxes, gaming systems, internet televisions, or the like; home or building systems such as home security systems, utility systems such as electrical, water, plumbing systems and apparatuses such as electric meters, water meters, hot water heaters, gas meters or the like; and personal devices such as wearable devices such as internet capable fitness devices, watches, glasses or the like. The list of smart devices provided herein is not exhaustive such that the smart device may be any device that includes a communication interface or module, software and/or hardware that allow the device to communicate data and/or information related to the device with other devices and/or systems over a network.

In accordance with embodiments of the invention, the term "custodian" refers to and includes any individual, organization, entity, or group thereof, that are responsible for a smart device and/or its maintenance. In some example implementations, a user of a smart device may be a custodian of that device. In many example implementations, particularly those that arise in the context of a home environment, a custodian will be the owner of the device. In other example implementations, such as those that arise in the context of a manufacturing facility, information technology (IT) facility, restaurant or food processing facility, and/or other business enterprise settings, a custodian may be an individual or team of individuals responsible for monitoring, maintaining, repairing, and/or replacing smart devices, or otherwise managing the acquisition, deployment, and/or use of smart devices within or across an enterprise.

As used herein, the term "host" or "host entity" means an entity that operates the smart device for its primary function or that interacts with the smart device for its primary function. For example, a cable service provider is the host entity for a user's cable box and associated cable service. Likewise, a utility, such as a power company, is the host entity for a user's electric meter and associated electric service. Moreover, for smart machines that require renewable products or accessories the host entity is the entity that provides the renewables used by the smart device. In some example implementations, the host entity may be a service company associated with the particular smart device or a class of smart devices. For example, a host entity associated with an HVAC system may be a contractor or tradesperson who installed the system and/or a company who provides maintenance and repair services to HVAC systems. Likewise, a host entity associated with a plumbing system may be a plumber. The "host entity" may include a "host system" with a "host entity device" that communicates with other devices described herein.

In some embodiments, an "entity" as used herein may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, a non-monetary user profile that includes only personal information associated with the user, or the like. The account is associated with and/or maintained by an entity. In other embodiments, an "entity" may not be a financial institution. In some embodiments, an "entity" may be a user.

As used herein, an "online banking account" is an account that is associated with one or more user accounts at a financial institution. For example, the user may have an online banking account that is associated with the user's checking account, savings account, investment account, and/or credit account at a particular financial institution. A username and password are typically associated with the online banking account and can be used by the user to gain access to the online banking account. The online banking account may be accessed by the user over a network (e.g., the Internet) via a computer device, such as a personal computer, laptop, or mobile device (e.g., a smartphone or tablet). The online banking account may be accessed by the user via a mobile or online banking website or via a mobile or online banking application. A customer may access an online banking account to view account balances, view transaction history, view statements, transfer funds, and pay bills. More than one user may have access to the same online banking account. In this regard, each user may have a different username and password. Accordingly, one or more users may have a sub-account associated with the online banking account.

In some embodiments, the "user" may be a customer (e.g., an account holder or a person who has an account (e.g., banking account, credit account, or the like) at the entity) or potential customer (e.g., a person who has submitted an application for an account, a person who is the target of marketing materials that are distributed by the entity, a person who applies for a loan that not yet been funded). In other embodiments, the "customer" may refer to the user.

Many of the embodiments and example implementations thereof described herein are directed toward solving a pervasive technical problem that consumers at all levels, from individuals to global enterprises, have suffered without reprieve, namely, that critical systems often fail at inopportune times. Moreover, the costs associated with the emergency and/or ad hoc repair, replacement, and other remediation of unanticipated system failures are often much higher (monetarily, and in terms of time, convenience, stress, and other factors impacting individuals and businesses) than timed replacement, targeted repairs, or other interventions that prevent, delay, or mitigate system failure. Examples of such system failure can be highly problematic, such as the failure of HVAC systems during exceptionally hot or cold weather events, the unanticipated failure of critical IT components such as servers and the like, the failure of plumbing components during an extended travel period, vehicle failure on the way to an important meeting, and other unanticipated system failures that impede or impact the normal functioning of an individual, household, or business. While the use of back-up systems (such as emergency generators in the case of electrical systems, fans or space heaters in the case of HVAC systems, and the like) may allow for some limited mitigation of otherwise catastrophic system failure, such back-up systems are often expensive, prone to failure themselves, or otherwise inconvenient. Moreover, the costs of emergency service are often much higher than those associated with normal, scheduled service. Furthermore, when catastrophic system failure mandates the immediate replacement of failed components, it is often impossible to take the time to carefully select replacement components that satisfactorily meet all of the functional, aesthetic, pricing, and other requirements that would be imposed on a planned replacement purchase.

To solve this technical issue and related technical issues, many of the embodiments and example implementations contemplated herein recognize that a smart device may be configured to communicate information about the performance of the smart device that will allow for the identification and/or prediction of a stage in failure that a smart device may be in. For example, a smart device may be configured to communicate a usage pattern or profile, in the sense that the smart device may transmit information about when the smart device is turned on or off, the power consumption of the device, information about the use cycles of the device (such as the number of cycles performed, the duration of cycles, or other such information, for example), the status of consumable components of the device (such as filters, chemicals contained in reservoirs, coolants, lubricants, and other consumable items, for example), the age and/or service life of the device, or other data generated regarding the use and operation of the smart device. In situations where the smart device is able to run self-diagnostic protocols, such as HVAC systems, server systems, or other systems that are equipped to check the functioning of their various component parts and generate diagnostic codes, the smart device may be configured to communicate such diagnostic codes. Such information about the smart device and its functionality can be particularly useful in diagnosing and predicting whether the smart device is likely in need of maintenance, repair, and/or replacement, and when maintenance, repair, and/or replacement may be necessary in the future.

In some example implementations where the smart device is capable of transmitting information, either directly or indirectly, to a resource procurement system, such information can be particularly useful in permitting users and custodians of smart devices to predict how and when the maintenance, repair, and/or replacement of a smart device will impact them. For example, in situations where the usage pattern and/or diagnostic code(s) generated by a smart device indicate that the smart device has failed, is likely to fail, is obsolete, or the like, the resource procurement system may be able to send a targeted communication to the custodian and/or user of the smart device to indicate that a replacement smart device should be procured. The targeted communication may include an offer that, if accepted by the custodian/user, then results in the resource procurement system automatically procuring (e.g., ordering) the replacement smart device. Accordingly, the custodian/user may be able to promptly (e.g., in near real time) initiate the replacement of a device that is determined to have failure to whose failure is imminent. The targeted communication may further include usage information (e.g., information related to reliability, energy efficiency, operating cost, or the like) related to smart device of the same model, class, type, or the like of a suggested replacement device, which may aid the custodian/user in making a decision to procure a replacement smart device.

In some example implementations, additional benefits can be derived through the interaction of one or more smart devices and a resource procurement system. In some example implementations, the resource procurement system may be able to compare the information about the age and/or potential failure status of a business's servers against historical information regarding the business's cash flow, the pricing of servers, and other market information to identify a time when the business may need to plan to replace the servers, when the business may be able to get a favorable price on the replacement, and/or when the business may be in the best financial position to acquire the replacement. In the context of home environment, the resource procurement system may be able to detect that numerous appliances (such as a refrigerator, dishwasher, washer, dryer, stove and/or oven) are in various states of age and/or need of replacement. In response to such detection, the financial institution may be able to access information about the user's and/or custodian's preferences, aesthetics, prior purchases, and other information, along with information about trends in the market (such as the availability of new models, pricing trends, aesthetic trends, and other product information), and communicate to the user and/or custodian offers regarding potential replacement options (including but not limited to the identification of retailers or manufacturers from whom such replacement options may be available).

Additional benefits can be derived in example implementations where the resource procurement system receives data (either directly or indirectly) from numerous smart devices and/or resource management devices. In such implementations, the resource procurement system may be able to develop standard usage profiles and otherwise develop models that allow for the prediction of the failure of a smart device. For example, the resource procurement system may be able to detect that a subset of its users purchased a particular model of washing machine that is configured as a smart device. By aggregating and examining the data communicated by each of the smart washing machines, the resource procurement system may be able to detect a usage pattern that preceded the failure of the washing machine (such as a number of cycles, a change in the draw of electrical energy by the washing machine, a chronological age, a set of diagnostic codes, and/or other information). Moreover, because the resource procurement system may have improved visibility into the costs incurred by the custodians of the smart washing machines, the resource procurement system may be able to identify the time at which a custodian may want to take action with respect to the replacement of the washing machine to extend the life of the machine and/or obtain the best pricing on a replacement that best fits the preferences and needs of the custodian. Moreover, data collected from numerous smart devices may be aggregated to derive usage information that can be provided as part of a targeted communication related to a smart device replacement.

FIG. 1 provides a block diagram illustrating an environment 100 for system for intelligent resource procurement, in accordance with an embodiment of the invention. In some embodiments, the user resource includes financial assets that are securely distributed in a payment system associated with the user and/or one or more smart devices. As illustrated in FIG. 1, the environment 100 includes a user 110 where the user represents a customer having a relationship with at least one but typically more than one financial institution. A user of the system may be a person, but may also be a business or any other entity, including but not limited to a custodian of a smart device. In a typical environment thousands of users may access the resource procurement system system described herein.

The environment 100 also may include a plurality of user devices. The user devices may include any machine, apparatus, system or the like that may be connected to and communicate with other devices over network 150. At least one of the devices may include a computing device 120 for use by the user 110. The computing device 120 may be any device that employs a processor and memory and can perform computing functions, such as a personal computing device 300 or a mobile device 200, that may be connected to or access network 150. The personal computing device 300 may include a personal computer such as a desktop computer, laptop computer, tablet or any type of personal computing device that may be connected to a network by landline or wireless access such as wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. As used herein, the mobile device 200 may include any mobile communication device, such as a cellular telecommunications device (i.e., a cell phone or mobile phone), personal digital assistant (PDA), a mobile Internet accessing device, tablet computer, or other mobile device. A mobile device may connect to the network by a cellular telecommunications network or by WiFi, Bluetooth or other access technology. In some embodiments where, for example, the user is an institution the computing device 120 may include servers, access terminals, or the like.

The computing device 120 may be configured to communicate over network 150 with at least one intelligent resource procurement system 400 of an entity, such as a financial institution, and with one or more smart devices and/or resource management devices as will hereinafter be described. Other computer systems 160, such as a social networking system or a merchant system, may also be in communication with the computing device 120, resource procurement system 400, smart devices, resource management devices, and host entities. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet 151. In one embodiment, the network 150 may also include a wireless telephone network 152.

In general, the computing device 120 is configured to connect with the network 150 and may be used to log the user 110 into the intelligent resource procurement system 400 of the entity. A user 110 in order to access the user's account(s) typically uses an online banking application and/or mobile banking application on the intelligent resource procurement system 400 and must authenticate with the intelligent resource procurement system 400. For example, logging into the intelligent resource procurement system 400 generally requires that the user 110 authenticate his/her/its identity using a user name, a passcode, a cookie, a biometric identifier, a private key, a token, and/or another authentication mechanism that is provided by or for the user 110 to the intelligent resource procurement system 400 via the computing device 120. In some embodiments the authentication system may be a tiered system that may require different levels of authentication based on conditions such as, for example, previous activity of the user over the network 150. For example, the tiered authentication system may have three levels of authentication—hard, medium and soft. Hard authentication may require that the user input a high level of authentication information such as a combination of password, user identification, answer to challenge questions, biometrics, random key number or the like. A hard authentication might be required when the user logs on from an unrecognized user device or where the user activity is not recognized by the system. A medium authentication level may require only a user identification and password. A medium level of authentication might be required where, for example, the user has already logged-in to the computing device 120 using an authentication procedure for the device such as a thumbprint or password. A soft authentication may require only a user identification such as user name. A soft level of authentication may be used, for example, where the user has already logged-in to the computing device 120 using an authentication procedure for the device such as a thumbprint or password and the user has performed activities on the user device that are recognized as "normal" activity for that user and/or the user device is in a recognized location for that user. Thus, the level of authentication required for accessing the banking application, whether online, mobile or in person, may be adjusted based on conditions, activity, functions or information received about or from the user.

FIG. 2 provides a block diagram illustrating a user's mobile device 200 of FIG. 1 in more detail, in accordance with embodiments of the invention. In one embodiment of the invention, the mobile device 200 is a mobile telephone. However, it should be understood that a mobile telephone and the embodiment of the mobile device 200 shown in FIG. 2 are merely illustrative of one type of mobile device 200 that may benefit from, employ, or otherwise be involved with embodiments of the present invention and, therefore, should not be taken to limit the scope of embodiments of the present invention. Other types of mobile devices 200 may include portable digital assistants (PDAs), pagers, tablets, mobile televisions, gaming devices, laptop computers, cameras, video recorders, audio/video player, radio, GPS devices, or any combination of the aforementioned.

Some embodiments of the mobile device 200 include a processor 210 communicably coupled to such devices as a memory 220, user output devices 236, user input devices 240, and a network interface 260. The mobile device 200 further includes a power source 215, such as a battery, for powering various circuits and other devices that are used to operate the mobile device 200. Embodiments of the mobile device 200 may also include a clock or other timer 250 configured to determine and, in some cases, communicate actual or relative time to the processor 210 or one or more other devices. The processor 210, and other processing devices described herein, generally include circuitry for implementing communication and/or logic functions of the associated device. For example, the processor 210 may include a digital signal processor device, a microprocessor device, and various analog to digital converters, digital to analog converters, and/or other support circuits. Control and signal processing functions of the mobile device 200 are allocated between these devices according to their respective capabilities. The processor 210 thus may also include the functionality to encode and interleave messages and data prior to modulation and transmission. The processor 210 can additionally include an internal data modem. Further, the processor 210 may include functionality to operate one or more software programs, which may be stored in the memory 220. For example, the processor 210 may be capable of operating a connectivity program, such as a web browser application 222. The web browser application 222 may then allow the mobile device 200 to transmit and receive web content, such as, for example, location-based content and/or other web page content, according to a Wireless Application Protocol (WAP), Hypertext Transfer Protocol (HTTP), and/or the like. The memory device 220 may include other applications such as e-mail application 224 and SMS application 223.

The processor 210 is configured to use the network interface 260 to communicate with one or more other devices on the network 150. In this regard, the network interface 260 includes an antenna 276 operatively coupled to a transmitter 274 and a receiver 272 (together a "transceiver"). The processor 210 is configured to provide signals to and receive signals from the transmitter 274 and receiver 272, respectively. The signals may include signaling information in accordance with the air interface standard of the applicable cellular system of the wireless telephone network 152. In this regard, the mobile device 200 may be configured to operate with one or more air interface standards, communication protocols, modulation types, and access types. By way of illustration, the mobile device 200 may be configured to operate in accordance with any of a number of first, second, third, and/or fourth-generation communication protocols and/or the like. For example, the mobile device 200 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Consolidated Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 3GPP protocols and/or the like. The mobile device 200 may also be configured to operate in accordance with non-cellular communication mechanisms, such as via a wireless local area network (WLAN) or other communication/data networks.

The network interface 260 may also include a near field communication (NFC) interface 270. As used herein, the phrase "NFC interface" generally refers to hardware and/or software that is configured to contactlessly and/or wirelessly send and/or receive information over relatively short ranges (e.g., within four inches, within three feet, within fifteen feet, and the like). The NFC interface 270 may include a smart card, key card, proximity card, Bluetooth® device, radio frequency identification (RFID) tag and/or reader, transmitter, receiver, and/or the like. In some embodiments, the NFC interface 270 communicates information via radio, infrared (IR), and/or optical transmissions. In some embodiments, the NFC interface 270 is configured to operate as an NFC transmitter and/or as an NFC receiver (e.g., an NFC reader). Also, it will be understood that the NFC interface 270 may be embedded, built, carried, and/or otherwise supported in and/or on the mobile device 200. In some embodiments, the NFC interface 270 is not supported in and/or on the mobile device 200, but the NFC interface 270 is otherwise operatively connected to the mobile device 200 (e.g., where the NFC interface 270 is a peripheral device plugged into the mobile device 200). Other apparatuses having NFC interfaces mentioned herein may be configured similarly. In some embodiments, the NFC interface 270 of the mobile device 200 is configured to contactlessly and/or wirelessly communicate information to and/or from a corresponding NFC interface of another apparatus (e.g., an automated teller machine (ATM) or another mobile or computing device).

As described above, the mobile device 200 has a user interface that may be made up of user output devices 236 and/or user input devices 240. The user output devices 236 include a display 230 (e.g., a liquid crystal display or the like) and a speaker 232 or other audio device, which are operatively coupled to the processor 210. The user input devices 240, which allow the mobile device 200 to transmit data, may include any of a number of devices allowing the mobile device 200 to transmit data, such as a keypad, keyboard, touch-screen, touchpad, microphone, mouse, joystick, other pointer device, button, soft key, and/or other input device(s). The user interface may also include a camera 280, such as a digital camera.

The mobile device 200 may also include a positioning system device 275 that is configured to be used by a positioning system to determine a location of the mobile device 200. For example, the positioning system device 275 may include a GPS transceiver. In some embodiments, the positioning system device 275 is at least partially made up of the antenna 276, transmitter 274, and receiver 272 described above. For example, in one embodiment, triangulation of cellular signals may be used to identify the approximate location of the mobile device 200. In other embodiments, the positioning system device 275 includes a proximity sensor or transmitter, such as an RFID tag, that can sense or be sensed by devices known to be located proximate a location to determine that the mobile device 200 is located proximate these known devices.

The memory 220 is operatively coupled to the processor 210. As used herein, "memory" or "memory device" includes any computer readable medium (as defined herein below) configured to store data, code, or other information. The memory 220 may include volatile memory, such as volatile Random Access Memory (RAM) including a cache area for the temporary storage of data. The memory 220 may also include non-volatile memory, which can be embedded and/or may be removable. The non-volatile memory can additionally or alternatively include an electrically erasable programmable read-only memory (EEPROM), flash memory or the like.

The memory 220 can store any of a number of applications which include computer-executable instructions/code executed by the processor 210 to implement the functions of the mobile device 200 and/or one or more of the process/method steps described herein. The memory 220 includes a resource management application 221 that may be used to allow communication with an entity system such as the intelligent resource procurement system 400 and/or the smart devices to implement the system of the invention. The use of the resource management application 221 may facilitate access to the system of the invention by providing log-in systems including user authentication systems, account information, system controls or the like. The resource management application 221 also communicates with the smart devices and the intelligent resource procurement system 400 to allow the user to set up and/or control the system of the invention. In some embodiments, the resource management application 221 is an online banking application that provides, among other things, resource management functionality as described herein.

These applications also typically provide a graphical user interface (GUI) on the display 230 that allows the user 110 to communicate with the mobile device 200, the intelligent resource procurement system 400 and/or other devices or systems. The memory 220 can also store any of a number of pieces of information, and data, used by the mobile device 200 and the applications and devices that make up the mobile device 200 or are in communication with the mobile device 200 to implement the functions of the mobile device 200 and/or the other systems described herein. For example, the memory 220 may include such data as user authentication information.

Referring now to FIG. 3, the personal computing device 300 also includes various features, such as a network communication interface 310, a processing device 320, a user interface 330, and a memory device 350. The network communication interface 310 includes a device that allows the personal computing device 300 to communicate over the network 150 (shown in FIG. 1). In one embodiment of the invention, a network browsing application 355 provides for a user to establish network communication with an intelligent resource procurement system 400.

As used herein, a "processor" or "processing device," such as the processing device 320, generally refers to a device or combination of devices having circuitry used for implementing the communication and/or logic functions of a particular system. For example, a processing device 320 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 320 may further include functionality to operate one or more software programs based on computer-executable program code thereof, which may be stored in memory device 350. As the phrase is used herein, a processor or processing device may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "user interface" generally includes a plurality of interface devices and/or software that allow a customer to input commands and data to direct the processing device to execute instructions. For example, the user interface 330 presented in FIG. 3 may include a graphical user interface (GUI) or an interface to input computer-executable instructions that direct the processing device 320 to carry out specific functions. The user interface 330 employs certain input and output devices as previously described with reference to FIGS. 1 and 2. These input and output devices may include a display, mouse, keyboard, button, touchpad, touch screen, microphone, speaker, LED, light, joystick, switch, buzzer, bell, and/or other user input/output device for communicating with one or more users.

As used herein, a "memory" or "memory device" generally refers to a device or combination of devices that store one or more forms of computer-readable media for storing data and/or computer-executable program code/instructions. Computer-readable media is defined in greater detail below. For example, in one embodiment, the memory device 350 includes any computer memory that provides an actual or virtual space to temporarily or permanently store data and/or commands provided to the processing device 320 when it carries out its functions described herein. The memory device 350 may include such applications as a conventional web browsing application 355 and/or a resource management application 356. The resource management application 356 may be used to allow communication with an entity system, such as the intelligent resource procurement system 400, to provide access to the entity log-in systems including user authentication systems, account information or the like as previously described with respect to FIG. 2.

FIG. 4 provides a block diagram illustrating the intelligent resource procurement system 400, in greater detail, in accordance with embodiments of the invention. As illustrated in FIG. 4, in one embodiment of the invention, the intelligent resource procurement system 400 includes one or more processing devices 420 operatively coupled to a network communication interface 410 and a memory device 450. In certain embodiments, the intelligent resource procurement system 400 is operated by an entity, such as a financial institution.

It should be understood that the memory device 450 may include one or more databases or other data structures/repositories. The memory device 450 also includes computer-executable program code that instructs the processing device 420 to operate the network communication interface 410 to perform certain communication functions of the intelligent resource procurement system 400 described herein. For example, in one embodiment of the intelligent resource procurement system 400, the memory device 450 includes, but is not limited to, a network server application 470, an authentication application 460, a customer account data repository 480 which includes customer authentication data 480 and customer account information 484, a mobile banking application 490 including a mobile web server application 493, and other computer-executable instructions or other data. The computer-executable program code of the network server application 470, the authentication application 460, or the mobile banking application 490 may instruct the processing device 420 to perform certain logic, data-processing, and data-storing functions of the intelligent resource procurement system 400 described herein, as well as communication functions of the intelligent resource procurement system 400. The mobile banking application 490 communicates with the user computing devices 120 to facilitate communication between the user and the entity.

In one embodiment, the customer account data repository 480 includes customer authentication data 482 and customer account information 484. The network server application 470, the authentication application 460, and the mobile banking application 490 are configured to invoke or use the customer account information 484, the customer authentication data 482 when authenticating a user to the intelligent resource procurement system 400.

The intelligent resource procurement system 400 further includes a resource management application 500 that communicates with the smart devices 600, the user's computing devices 120, the resource management devices, and/or the host entities. The resource management application 500 functions to manage a user's resources (e.g., as informed by the resource management application 856 of a resource management device 800). In some embodiments, the resource management application 500 is an application that assists a user in procuring resources, such as smart devices.

As used herein, a "communication interface" generally includes a modem, server, transceiver, and/or other device for communicating with other devices on a network. The network communication interface 410 is a communication interface having one or more communication devices configured to communicate with one or more other devices on the network 150, such as the mobile device 200, the personal computing device 300, and the resource management device 800 and/or the smart device 600. The processing device 420 is configured to use the network communication interface 410 to transmit and/or receive data and/or commands to and/or from the other devices connected to the network 150.

FIG. 5 provides a block diagram illustrating smart device 600, in accordance with embodiments of the invention. A "smart device" as used herein means a device, apparatus and/or system that is capable of communicating with and transmitting information or data to and/or receiving information or data from other devices, systems or apparatuses including over network 150. FIG. 5 illustrates an exemplary embodiment of a smart device. The smart device 600 may be for example, but not limited to, a machine such as an automobile, tractor trailer, airplane, manufacturing device, warehouse devices, material handling system, conveyor system, robotics or the like; appliances such as refrigerators, washer/dryers, dish washers, or the like; home entertainment devices or systems such as set top boxes, gaming systems, internet televisions, or the like; home or building systems such as home security systems, utility systems such as electrical, water, plumbing systems and apparatuses such as electric meters, water meters, hot water heaters, gas meters or the like; and personal devices such as wearable devices such as internet capable fitness devices, watches, glasses or the like. The list of smart devices provided herein is not exhaustive such that the smart device 600 may be any device that includes a communication interface or module, software and/or hardware that allow the device to communicate data and/or information related to the device with other devices and/or systems over network 150.

As illustrated in FIG. 5, one exemplary embodiment of a smart device 600 may generally include, but is not limited to, a network communication interface 610, a processing device 620, and a memory device 650 such as described herein. The processing device 620 is operatively coupled to the network communication interface 610 and the memory device 650. The smart device may also have a control system 640 for controlling the physical operation of the device. The control system may include one or more sensors 641 for detecting operating conditions of the various mechanical and electrical systems 660 of the smart device or of the environment in which the smart device is used. The sensors 641 may communicate with the processing device 620 to provide feedback to the operating systems of the device. The control system 640 may also include metering devices 642 for measuring performance characteristics of the smart device. The control system 640 may also include controllers such as programmable logic controllers (PLC), proportional integral derivative controllers (PID) or other machine controllers. The smart device may also include various electrical, mechanical, hydraulic or other systems 660 that perform various functions of the smart device. These systems may include, for example, electrical circuits, motors, compressors, or any system that enables functioning of the smart device.

In one embodiment, applications having computer-executable program code that instruct the processing device 620 to operate the various systems of the smart device including network communication interface 610 to perform certain communication functions and to perform certain logic, data processing, and data storing functions of the application as described herein are stored in memory device 650. The applications may include a smart device operating application 655 that controls the various systems 640, 660 and functions of the smart device to control operation of the smart device during use.

The network communication interface 610 is a communication interface having one or more communication devices configured to communicate with one or more other devices on the network 150. The processing device 620 is configured to use the network communication interface 610 to receive information from and/or provide information and commands to other devices and systems via the network 150. The network communication interface 610 may be over a wireless connection or a wired connection such as described above. The smart device may also include a user interface 630. The user interface allows inbound and/or outbound communication with the smart device and may take a wide variety of forms depending on the type of smart device. The user interface may include interface devices as previously described with respect to FIGS. 3 and 4 and/or may include other user interface devices such as appliance input devices such as push buttons, entertainment input devices such as remote controls, vehicle input devices such as found on an automobiles infotainment systems or the like. In some embodiments the input device may be controlled by the host entity such that the smart device is secure. For example, with a utility meter the user interface 630 may be controlled by the utility. In some embodiments, such as utility meters the input device may be a specialized plug-in device or it may be remote from the smart device and may access the smart device over a public or private network.

The smart device may also include a resource management device communication interface 670 that allows the smart device 600 to be connected to and to communicate with a resource management device 800. The resource management device communication interface may include a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface the smart device may also include a communication interface that may be connected by a hard-wire connection to the resource management device. The communication interface may include a connector such as a USB, SATA, PATA, SAS or other data connector for transmitting data to and from the smart device. In some embodiments the smart device may include a port or plug that is compatible with a mating port or plug on the resource management device. In some embodiments the network communication interface 610 may function as both the network interface device and the resource management device communication interface 670.

The smart device 600 may also include a positioning system device 675 that is configured to be used by a positioning system to determine a location of the smart device 600. For example, the positioning system device 675 may include a GPS transceiver. In some embodiments, the positioning system device 675 is at least partially made up of components of the network communication interface. For example, in one embodiment, triangulation of cellular signals may be used to identify the approximate location of the smart device 600. In other embodiments, the positioning system device 675 includes a proximity sensor or transmitter, such as an RFID tag, that can sense or be sensed by devices known to be located proximate a location to determine that the smart device 600 is located proximate these known devices.

As illustrated in FIG. 6, one exemplary resource management device 800 may generally include, but is not limited to, a network communication interface 810, a smart device communication interface 830, a processing device 820, and a memory device 850 such as described herein. The processing device 820 is operatively coupled to the network communication interface 810, the smart device communication interface 830 and the memory device 850. In one embodiment, applications having computer-executable program code that instructs the processing device 820 to operate the various functions of the resource management device to perform certain communication functions and to perform certain logic, data processing, and data storing functions of the application as described herein are stored in memory device 850. The applications may include a resource management application 856 that communicates with the smart device 600 and the intelligent resource procurement system 400 as will be described.

The network communication interface 810 is a communication interface having one or more communication devices configured to communicate with one or more other devices on the network 150. The processing device 820 is configured to use the network communication interface 810 to receive information from and/or provide information and commands to other devices and systems via the network 150. The network communication interface 810 may be over a wireless connection or a wired connection such as described above. The resource management device 800 may also include a smart device communication interface 830 that allows the resource management device 800 to be connected to and to communicate with a smart device 600. The smart device communication interface 830 may include a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface the resource management device 800 may also include a communication interface device that may be connected by a hardwire connection to the smart device. The communication interface device may include a connector such as a USB, SATA, PATA, SAS or other data connector for transmitting data to and from the smart device 600. In some embodiments the smart device communication interface 830 may include a port or plug that is compatible with a mating port or plug on the smart device. In some embodiments the network communication interface 810 may function as both the network interface device and the smart device communication interface 830. The smart device communication interface 830 of the resource management device 800 is operatively coupled to the resource management device communication interface 670 of the smart device 600 to allow the smart device 600 to communicate with the resource management device 800. The interfaces 670 and 830 allow host information to be communicated between the smart device and the resource management device where host information may include any information used by the resource management device 800 to transmit the data and/or and initiate a secure management of resources in connection with the intelligent resource procurement system.

The resource management device 800 may also include a user interface 860. The user interface 860 allows inbound and/or outbound communication with the resource management device and may take a wide variety of forms depending on the type of resource management device 800. The user interface may include interface devices as previously described with respect to FIGS. 3, 4, and/or 5 may include other user interface devices. In some embodiments the input device may be controlled by the entity such that the resource management device 800 is secure. In some embodiments, such as with utility meters the input device may be a specialized plug-in device or it may be remote from the resource management device 800 and may access the resource management device 800 over a public or private network.

In one embodiment, the resource management application 856, processing device 820 and the memory device 850 are operable to communicate with and/or effect a transaction with an intelligent resource procurement system 400. The smart device may be programmed with an interface application 656 during manufacture of the smart device 600 to interact and complete a data exchange with the resource management device 800. The resource management application 856 of resource management device 800 may communicate with a third party entity system, such as intelligent resource procurement system 400, that is not related to the host entity of the smart device 600. In other words the resource management device 800 may be programmed with the resource management application 856 to communicate with a third party system (e.g. the intelligent resource procurement system 400) where the third party system is operated and managed by an entity that is independent of the host system.

The term "host entity" as used herein means the entity that operates the smart device for its primary function or that interacts with the smart device for its primary function. For example, a cable service provider is a host entity for a user's cable box and associated cable service. Likewise, a utility, such as a power company, is a host entity for a user's electric meter and associated electric service. Moreover, for smart machines that require renewable products or accessories a host entity is the entity that provides the renewables used by the smart device. In some example implementations, a host entity may be a service company associated with the particular smart device or a class of smart devices. For example, a host entity associated with an HVAC system may be a contractor or tradesperson who installed the system and/or a company who provides maintenance and repair services to HVAC systems. Likewise, a host entity associated with a plumbing system may be a plumber. The "host entity" may include a "host system" with a "host entity device" that communicates with other devices described herein. As used herein "third party entity" refers to an entity that is not the host entity and that utilizes the resource management application 856 to distribute resources on behalf of a user. The "third party entity" may include a "third party system" with a "third party device" that communicates with other devices described herein. For example, the third party entity may be a financial institution that provides a payment rail to the host entity for services or products associated with the smart device and/or otherwise communicates with the host entity regarding aspects of the smart device. Specific example embodiments of the operation of the system will be provided. In one example embodiment, the third party system is the intelligent resource procurement system 400 of a financial institution and the resource management between the smart device, the host entity and the financial institution is a financial transaction that may include a payment from the user's financial institution to the host entity and/or a communication regarding the maintenance, repair, and/or replacement of the smart device and the payment therefor.

Referring to FIGS. 1, 5 and 6, an embodiment of one process and system will be described. In this embodiment the smart device 600*a* includes a device that requires a predetermined payment by the user to enable operation of the device and/or provision of a service over that device. Example embodiments of such devices and services are systems that require the user to enter into a contract or subscription with a service provider where the terms of the contract or subscription require agreed upon payments in order for the user to obtain the contracted for service. Such systems are referred to herein as "subscription" systems, services and devices. Common examples of such subscription devices include, but are not limited to, cellular phones, tablets, laptop computers, personal computers, set top boxes, wearable devices, land line phones, receivers such as cable boxes, satellite receivers, internet ready televisions, or the like. Such devices may provide cellular phone service, entertainment services such as cable, satellite, internet that provide television, movie, news, music or other content to a user. Other examples of such devices and services are automobiles with wireless audio connectivity, and security systems with control boxes having wireless or hard wired connectivity. Still other examples of such devices and services are connected gaming systems and consoles. In these and other similar systems the operation of the system, the provision of content and/or services associated with system and the manufacture, sale, lease, installation or other provision of devices is controlled and/or provided by one or more host entities 701. For example, the host entity may include, but is not limited to, cable television provider, a phone service company, a satellite television/radio provider, a gaming company, an ISP, an automobile manufacturer, a security company, a content provider or other entity. In some embodiments the entity that provides the smart device and the entity that provides the associated service may be different entities where one or both of the entities may be a host entity. For example, a television manufacturer may provide an internet ready television but the service may be provided by a separate content provider such as an internet streaming service. In other embodiments the host entity provides both the smart device and the associated service. For example, with the example of cable television the host entity may include the cable system operator that manufactures or contracts for the manufacture of equipment, installs the infrastructure, sells or leases the equipment to the end user and arranges the provision of content to the user. The user may pay for the subscribed service either in regular installments or on a per use basis. For example, the user may pay a regular monthly payment and/or an on-demand per use rental fee. The terms and conditions of the payments may be maintained in the memory device 850 of the resource management device 800*a* and are accessible to the resource management application 856.

In one embodiment of the invention, the resource management device 800*a* is programmed with a resource management application 856 that provides for the acquisition and transmission of data regarding the functionality of the smart device 600*a* such as a usage profile and/or diagnostic code associated with the smart device 600*a* such that communication of a set of smart device data and instruction information related thereto may be initiated by the resource management device 800*a* in cooperation with smart device 600*a*. The resource management device 800*a* may be in machine to machine communication with the smart device 600*a* over communication interfaces 670, 830. The resource management device 800*a* may be in direct machine to machine communication with the intelligent resource procurement system 400 over network 150. The resource management device 800*a* may function to initiate and/or effectuate a targeted communication with the host entity system 700 of the host entity 701. In one embodiment the resource management application 856 of resource management device 800 transmits a secured request such as a token to the intelligent resource procurement system 400 over network 150 via network communication interface 810 based on information stored in memory device 850 and/or as provided by the smart device 600*a* to the resource management device 800*a*. The secured request includes resource management information where resource management information is a set of instruction information (such as a set of smart device data, an identification of a failure condition of the smart device, and a set of contact information associated with the custodian or user of the smart device), that the intelligent resource procurement system 400 uses to initiate a targeted communication with the host entity 701 and/or between the host entity 701 and a custodian (such as user 110 of smart device 600*a*). In a system that uses a token or other secured request, the resource management information may have no intrinsic value. The secured request is informed by and transmitted in accordance with the terms, conditions, or other rules set by the intelligent resource procurement system 400 and/or the subscription host entity 701. For example, a secured request may be sent requesting periodic service or maintenance of a smart device 600*a* associated with host entity 701 and user 110. Tokenization security systems are known where a token having no intrinsic value is substituted for sensitive data such that the authorization does not involve the transmission of sensitive data. As a result, security is enhanced and security risks from data breaches are reduced. In the present invention, the token may be substituted for user and/or custodian account information, personal identification information, and/or potentially sensitive information about a damaged smart device, such that the token generated by the resource management device 800 may be attributed to a user and/or custodian account at the financial institution. The smart device 600*a* and host entity 701 may not have user account information or other potentially sensitive information which is instead securely maintained by the intelligent resource procurement system 400. As a result, the security of the user's financial or otherwise sensitive information can be maintained by a single entity such that security over the user's financial or otherwise sensitive information may be controlled and enhanced. The resource management device 800*a* generates the secured request based on the smart device information using the resource management application 856 and transmits the secured request and/or instruction information using network communication interface 810 to the intelligent resource procurement system 400 over network 150. The secured request and/or instruction information is received by the intelligent resource procurement system 400 and the resource management information (such as a set of instruction information associated with a failure condition of a smart device) in the request is recognized by intelligent resource procurement system 400. Upon receiving the resource management information, the intelligent resource procurement system 400 transmits information to the host entity system 700 in accordance with the resource management application 500. Where the resource management application 856 is an application configured to relay smart device usage and/or failure condition information and instruction information thereto, the intelligent resource procurement system 400, using resource management application 500, generates a transmission to the host entity 701 that can be used to initiate a targeted communication between the host entity and the custodian of the smart device 600*a*. For example, the intelligent resource procurement system 400 may transmit a message to the host entity 701 that includes information about the smart device 600*a*, a failure condition thereof, contact information for the custodian of device 600*a* and an indication that the host entity 701 should contact the custodian.

The terms and conditions of the resource management and communication associated therewith may be agreed to by the user/custodian and the third party entity and stored in resource management application 500. For example where the resource management application is a maintenance, repair, and/or replacement application, such as an application that monitors the status of a smart device, the terms and conditions of the service and contact related to service may be established. Upon taking control of, installing or otherwise accessing the resource management device 800*a*, the user or custodian may register the resource management device 800*a* with the intelligent resource procurement system 400 such that the intelligent resource procurement system 400 recognizes a secured request from that resource management device 800*a* as belonging to that user. The user/custodian may access the user's and/or custodian's account via an on-line application through a user computing device 120 to register the resource management device 800*a* with the intelligent resource procurement system 400. In the case of a financial institution the user may register the resource management device 800*a* through the mobile banking application 490. The user may also register the resource management device 800*a* with the intelligent resource procurement system 400 other than using an on-line application. In some embodiments the resource management device 800*a* may register itself with the intelligent resource procurement system 400 based on information provided to the resource management device 800*a* by the user during start-up of the smart device.

Referring again to FIGS. 1, 5 and 6, the smart device 600*b* may include a smart device that meters usage of a product or service where payment by the user is based on usage levels. Example embodiments of such devices and services are systems such as utilities including, but not limited to, water utilities, electrical utilities, gas utilities that utilize meters to determine usage. With the system of the invention, the smart device 600*b* includes a metering device 642 or other sensor 641. The resource management application 856 provides for monitoring of user's usage of the resource management device 800*b*, and may also monitor other aspects of a usage profile of the resource management device 800*b*, including but not limited to the recognition of diagnostic codes generated by the resource management device 800*b*. As depicted in FIG. 1, resource management device 800*b* is in machine to machine communication with the intelligent resource procurement system 400. In one embodiment, the resource management application 856 includes a maintenance application that transmits a secured request such as a token to the intelligent resource procurement system 400. The secured request is received by the intelligent resource procurement system 400 and is recognized as an instruction to initiate a targeted communication between the host entity system 900 (e.g. the utility or other host entity 901 that operates the smart device 600*b*) and the custodian of smart device 600*b* to provide service and/or replacement of the smart device 600*b*. The resource management device 800*b* generates a secured request based on the resource management application 856 embedded in the resource management device 800 and transmits the secured request to the intelligent resource procurement system 400 using interface 810 over network 150. Upon receiving and recognizing the secured request, the resource procurement system 400 may generate a message to the host entity system 900 based upon the terms with the user and/or custodian. The message is received by the host entity system 900 and the host entity system may send a targeted communication to the custodian of smart device 600*b* to regarding the service need of the custodian.

As also shown in FIG. 1, the smart device 600*c* may include a device that is used with a renewable product. Example embodiments of such devices and systems include water filtration systems that require new filters; water softener systems that require salt; appliances such as washing machines, dryers, dishwashers, and the like that require detergent, bleach, fabric softeners and the like; HVAC systems that require air filters; automobiles, boats, trucks and other vehicles that require oil, filters, light bulbs or the like. Other examples of such systems are smart home/building systems where systems such as HVAC, security systems, utilities, lighting, or the like may include interconnected smart devices that may include one or more of the devices discussed above. In a smart system the renewable product may include one or more of the renewable products discussed above in addition to other renewable products such as light bulbs, trash can liners, food, batteries or any renewable product. The smart device 600*c* may also include devices such as a refrigerator that monitors food usage, a trash can that monitors trash bag liner usage, a home electrical smart grid, smart lamps, or light fixtures that monitor light bulb operation or other devices and systems. The embodiments described above are by way of example only and a wide variety of devices and systems may be used in the system of the invention.

Typically the smart device 600*c* may include one or more sensors 641 that detect or determine a status of the renewable product or the smart device may include program logic in operating application 655 and/or resource management application 656 that estimates the status of the renewable product. The smart device 600*c* may include a sensor 641 that directly monitors the status of the renewable product. For example, in a water filtration system the sensor 641 may monitor the water flow rate through the water filter; in a HVAC system the sensor 641 may monitor the air flow rate through the air filter; in a lighting system the sensor 641 may monitor the current drawn by a light bulb in a fixture; in a refrigerator the sensor 641 may monitor the weight of a gallon of milk. The embodiments described above are by way of example only and are not intended to be limiting and a wide variety of devices and systems may be used in the system of the invention. In other embodiments, the status of the renewable product may be determined by program logic rather than the direct monitoring of the renewable product. For example, the status of the renewable product may be based on time intervals, usage rates, or the like. For example, in an HVAC system or water filtration system the replacement of a filter may be determined by a calculation of hours of usage rather than flow rate through the filter; in a "smart refrigerator" food may be evaluated based on time intervals (e.g. a carton of milk ordered every week) rather than on direct testing of the product. The host entity 1001 may include any entity having a host entity system 1002 from which the smart device 600c can order the renewable product over network 150 and/or from which the smart device can receive maintenance, repair, or other services. For example the host entity may include a service business with an on-line presence, an e-commerce site, a dedicated web site, a host entity web site or the like.

In systems that use a renewable product such as those described above, the smart device 600c may order periodic service (such as the delivery and/or installation of replacement products) when replacement of the renewable product is determined by the smart device 600c and/or the resource management device 800c. The order may be placed by the smart device 600c to a host entity system 1002 of host entity 1001. The host entity may be a dedicated source of the renewable product, such as a water filtration system manufacturer/operator that provides replacement water filters, or the host entity may be an on-line retailer that is unrelated to the smart machine other than acting as the source of the renewable product. In either event the smart device 600c is in machine to machine communication with the host entity system 1002 of the host entity selling or providing the renewable product over network 150. The smart device 600c is also in machine to machine communication with resource management device 800c over communication interfaces 670, 830. The operating application 655 of the smart device 600c initiates the order for the appropriate service and/or renewable product. The order may be based on the output of a sensor or program logic. When the smart device determines that a renewable is needed or that service may be necessary, the resource management application 856 of resource management device 800c causes a message to be transmitted over the communication interfaces 670, 830 for the resource management device to send a secured request, such as a token, to the intelligent resource procurement system 400. The secured request is received by the intelligent resource procurement system 400 and the order for the renewable and/or service is made from the resource procurement system to the host entity system 1002 over network 150 upon receipt of the token.

In addition to the communications from the resource management device 800 to the financial institution, the system may allow communication to the resource management device 800 such that the user, custodian, and/or intelligent resource procurement system may direct the resource management options. For example, the custodian may set limits on the frequency with which a financial institution may cause targeted communications be initiated between a host entity and the custodian. Such limits may be based on the type of smart device, the perceived severity of the service or replacement need, plans established by the custodian and shared with the financial institution, and other factors. The user and/or custodian may directly communicate with the resource management device 800 over network 150 using computing device 120 or the user instructions may be communicated to the intelligent resource procurement system 400 from the user such as by computing device 120 over network 150 and the intelligent resource procurement system 400 may communicate with the smart device over network 150. In some embodiments the limits or controls put on the resource management device 800 may originate with the intelligent resource procurement system 400 such that the resource management may be controlled at least in part by the intelligent resource procurement system 400.

Although the intelligent resource procurement system 400 may receive usage information, diagnostic information, maintenance information, and other information from a resource management device as described above, such information may alternatively be received by the intelligent resource procurement system 400 from a smart device, a computing device 120 of a smart device custodian, or from host entity. In one exemplary embodiment, a user/custodian may directly register a smart device with the intelligent resource procurement system 400 such that the intelligent resource procurement system 400 can recognize such smart device as belonging to that user and can establish secure communications with such smart device. In another exemplary embodiment, a computing device 120 of user/custodian may be configured to receive information from a smart device (e.g., via a resource management application). The user/custodian may register the smart device and computing device 120 with the intelligent resource procurement system 400 such that the intelligent resource procurement system 400 can recognize such smart device and computing device 120 as belonging to that user and can establish secure communications with such computing device 120 (e.g., to receive information about the smart device). In yet another exemplary embodiment, a host entity system of a host entity may receive information from a smart device. The user/custodian of the smart device may register the smart device with the intelligent resource procurement system 400 such that the intelligent resource procurement system 400 can recognize such smart device as belonging to that user. Based on this registration, the intelligent resource procurement system 400 may establish a secure communications with the host entity system to receive information about the smart device.

FIG. 7 depicts a method 1100 of providing intelligent resource procurement in accordance with the present invention. The steps described with respect to FIG. 7 are typically performed by the intelligent resource procurement system 400, but may be performed by other devices or systems described herein.

Initially, a resource deficiency associated with an entity is identified. Typically, the entity is a user who has an account with an organization (e.g., a financial institution) that operates the intelligent resource procurement system 400. As used herein a "resource deficiency" refers to an unmet need or desire of the entity that can be met by acquiring a new smart device. In this regard, the user may have one or more smart devices, which the user may have registered with the intelligent resource procurement system 400 as described herein.

In one embodiment, a resource deficiency may refer to the failure or potential failure of one of these smart devices. Accordingly, in order to identify a resource deficiency, the intelligent resource procurement system 400 may receive smart device data including an identification of a smart device (such as a make and/or model number, a unique identifier, and/or other information associated with the identity of the smart device) and a usage profile associated with the smart device. A usage profile may include any information associated with the use of the smart device. For example, the usage profile may include the age of the smart device, the number of cycles the smart device has performed, data pertaining the power consumption of the smart device, a service history, and any other metrics or data generated in the course of the use of the smart device. The usage profile may include a diagnostic code, which may be generated by the smart device as part of the normal operation of the smart device, upon the triggering of an error condition, upon the receipt of a request to run a diagnostic protocol, or the like. The usage profile may then be analyzed to identify a failure condition of the smart device. A failure condition may be identified by comparing the usage profile associated with the smart device to a predetermined standard usage profile. A failure condition may also be identified by comparing the diagnostic code against a predetermined set of diagnostic codes associated with the smart device. The intelligent resource procurement system 400 may store standard usage profiles and/or diagnostic codes. Alternatively, the intelligent resource procurement system 400 may communicate with a relevant host entity or host entity system to acquire such standard usage profiles and/or diagnostic codes. In some example embodiments, a financial institution and/or a host entity may have developed a standard usage profile that may reflect, for example, the typical usage of a particular type or class of smart device, information associated with a probability of need of repair and/or replacement, and/or other information that is associated with operation and eventual failure of the smart device. Information used to create such a standard usage profile may be created based on monitoring and aggregating information related to other smart devices registered with the resource procurement system 400. Likewise, the diagnostic codes associated with the smart device may reflect self-diagnostic functionality designed and manufactured into the smart device from its inception, and be used to ascertain status of the smart device at a particular point in time.

In another embodiment, a resource deficiency may be identified based on a determination that a smart device is obsolete or that a replacement smart device may provide superior functionality (e.g., a newer make or model of the smart device is available). In another embodiment, a resource deficiency may be identified based on a determination that a new smart device may complement the functionality of an existing smart device. For example, if a smart device of the entity is an air conditioning unit, the intelligent resource procurement system 400 may determine that an intelligent thermostat would complement the use of the air conditioning unit. In another embodiment, a resource deficiency may be identified based on receiving a list of one or more smart device the entity would like to procure.

Next, at block 1104, a usage profile is received for each of a plurality of smart devices related to the resource deficiency. These smart devices are typically owned and operated by individuals or organizations other than the entity, who have registered their smart devices with the intelligent resource procurement system 400. As used herein, smart devices are "related to the resource deficiency" if such smart devices are the same type, class, or model as a new smart device that would address (e.g., remedy) the resource deficiency. For example, if the resource deficiency relates to an obsolete smart device, the plurality of smart devices may be the same type or class of smart device as a replacement smart device for the obsolete smart device.

At block 1106, the usage profiles of the plurality of smart devices are parsed to extract aggregate usage information. In other words, data contained in the usage profiles of the plurality of smart devices may be aggregated to determine population-wide metrics for the plurality of smart devices such as average reliability, average energy efficiency, average operating temperature, average power consumption, average operating cost, or the like.

At block 1108, a custodian is identified for each of the plurality of smart devices. In some embodiments, a custodian of a smart device may be determined based on identifying the individual or organization who registered a smart device with the intelligent resource procurement system 400. In other embodiments, an identity of the custodian may be included in a smart device's usage profile. In yet another embodiment, the custodian of a smart device may be identified based on comparing location information (e.g., historical location information) associated with the custodian with location information associated with the smart device. In this regard, the custodian may be identified by determining that the custodian is routinely collocated or otherwise located proximate to the smart device. Location information related to the custodian may include an address of the customer, location data received from a mobile device of the customer (e.g., location data generated by a positioning system of the mobile device), or an IP address of a mobile device of the customer. Location information related to the smart device may include location data generated by a positioning system of the smart device or an IP address of the smart device. For example, if the IP address of a smart device corresponds to the address of an individual, such individual may be determined to be the custodian of the smart device. In some instances the time and/or frequency of collocation may affect the determination of a smart device custodian. For example, if a mobile device of an individual is frequently collocated at night with a particular smart, then such individual may be determined to be the custodian of the smart device. However, if a friend of such individual is occasionally collocated during the day with the smart device, such friend might not be determined to be the custodian of the smart device.

In some embodiments, a determination may be made as to whether each custodian is a trusted custodian. Typically, a trusted custodian is a custodian who is a friend of the entity or who is otherwise in frequent contact with the entity. In some embodiments, the determination regarding whether a custodian is a trusted custodian is based on a social networking relationship between the entity and the custodian. Typically, the social network relationship is based on the degree of the relationship between the entity and the custodian within a particular social network. In this regard, two individuals would have a first degree relationship if they are directly connected (e.g., are friends) within a social network, and two individuals would have a second degree relationship if they are not directly connected, but share a mutual connection (e.g., a mutual friend) within a social network. In other embodiments, the social network relationship may be based on: whether or not two individuals are members of the same group with a social network, common interests between two individuals, similar user profiles within a social network, or any other commonality between two individuals within a social network. In this regard, a custodian may be determined to be a trusted custodian, if the custodian and the entity have a first degree relationship or are members of the same group within a social network. In other embodiments, the determination regarding whether a custodian is a trusted custodian is based on comparing location information (e.g., historical location information) associated with the custodian with location information associated with the entity. In this regard, the custodian may be determined to be a trusted custodian by determining that the custodian is at least occasionally (e.g., routinely) collocated or otherwise located proximate to the entity. For example, if a mobile device of the entity is regularly collocated with a mobile device of a custodian during working hours, the custodian and the entity may be coworkers, and so the custodian may be determined to be a trusted custodian.

At block 1110, a location of a portable electronic device of the entity is monitored (e.g., continuously monitored). The portable electronic device is typically a mobile device or other portable computing device of the entity. In order to monitor the location of the portable electronic device, the intelligent resource procurement system 400 may establish a secure communication channel with the portable electronic device. Thereafter, the intelligent resource procurement system 400 may regularly receive location information (e.g., GPS coordinates, an IP address, or the like) from the portable electronic device over the secure communication channel. In this regard, the intelligent resource procurement system 400 may regularly transmit a request over the secure communication channel, after which the portable electronic device may provide updated location information.

Based on monitoring the location of the portable electronic device of the entity, at block 1112, a determination is made that the portable electronic device is located proximate to (i) a first smart device of the plurality of smart devices and (ii) the custodian of the first smart device. In some embodiments, determining that the portable electronic device is located proximate to the first smart device and the custodian of the first smart device is based on determining whether the portable electronic device is located within a predetermined distance from the first smart device and the custodian of the first smart device. For example, the intelligent resource procurement system 400 may compare GPS coordinates associated with the portable electronic device with GPS coordinates associated with the first smart device and calculate a distance. It will be appreciated that the predetermined distance may be any distance sufficient to determine collocation of the portable electronic device, the first smart device, and/or the custodian. By way of further example, the intelligent resource procurement system 400 may determine collocation with the custodian by comparing GPS coordinates associated with the portable electronic device with GPS coordinates associated with a mobile device of the custodian.

In other embodiments, determining that the portable electronic device is located proximate to the first smart device or the custodian of the first smart device is based on determining whether the portable electronic device located within a geo-fence associated with the first smart device or the custodian. A geo-fence is a virtual perimeter that defines the boundaries of an actual geographic area. A geo-fence associated with the first smart device may be based upon a location history of the first smart device. A geo-fence associated with the custodian may correspond to a building associated with an address of the custodian.

Thereafter, based on determining that the portable electronic device is located proximate to (i) a first smart device of the plurality of smart devices and (ii) the custodian of the first smart device, at block 1114, instructions may be transmitted (e.g., over a secure communication channel) to the portable electronic device that cause the portable electronic device to display resource procurement information related to the resource deficiency. In this regard, these instructions may cause a resource management application (or other application) of the portable electronic device to display a graphical user interface that includes the resource procurement information. This resource procurement information typically includes a recommendation and/or offer for the entity to procure a new smart device that would address the resource deficiency. For example, if the resource deficiency is the failure of a particular smart device of the entity, the resource procurement information may include an offer to procure a new smart device to replace the failed smart device. The offer may be selectable so that the entity can accept the offer through the graphical user interface display on the portable electronic device. This resource procurement information also typically includes the aggregate usage information. Accordingly, a recommendation or offer may include statement, such as "5 of your friends are using this model, and it's been 95% reliable for them the past 2 years." or "Across 100 people, this model has been 90% reliable over the past 2 years." In some embodiments, the displayed aggregate usage information might only relate to population-wide metrics for smart devices of trusted custodians. In some embodiments, the displayed aggregate usage information may include both population-wide metrics for smart devices of trusted custodians and population-wide metrics for all relevant smart devices registered with the intelligent resource procurement system 400. In some embodiments, instructions to display the resource procurement information may only be transmitted to the portable electronic device if the custodian of the first smart device is a trusted custodian.

If the resource procurement information includes an offer to procure a new smart device, the intelligent resource procurement system 400 may subsequently receive an acceptance of the offer from the portable electronic device. Thereafter, the intelligent resource procurement system 400 may procure the new smart device for the entity, such as by placing an order for the new smart device with an appropriate merchant.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. Pat. application Ser. No. | Title | Filed On |
|---|---|---|
| 15/082,476 (now published as U.S. Pat. application Publication No. 2017/0279800) | ENHANCING AUTHENTICATION AND SOURCE OF PROOF THROUGH A DYNAMICALLY UPDATABLE BIOMETRICS DATABASE | Concurrently herewith |
| 15/082,229 (now granted as U.S. Pat. No. 9,507,984) | RESOURCE TAG GENERATION AND DEPLOYMENT FOR RESOURCE VALUATION AND DISTRIBUTION | Concurrently herewith |
| 15/082,233 (now published as U.S. Pat. application Publication No. 2017/0278035) | SYSTEM FOR REAL-TIME RELEASE OF ALLOCATED RESOURCES BASED ON DEVICE STAGE | Concurrently herewith |
| 15/082,591 (now granted as U.S. Pat. No. 9,743,272) | SECURITY IMPLEMENTATION FOR RESOURCE DISTRIBUTION | Concurrently herewith |
| 15/082,952 (now published as U.S. Pat. application Publication No. 2017/0278083) | SECURITY IMPLEMENTATION FOR USER RESOURCE OF DISTRIBUTION WITH PERIPHERAL DEVICE | Concurrently herewith |
| 15/082,603 (now published as U.S. Pat. application Publication No. 2017/0278133) | SYSTEM FOR MACHINE-INITIATED RESOURCE GENERATION AND CUSTOMIZATION | Concurrently herewith |
| 15/082,964 (now published as U.S. Pat. application Publication No. 2017-0278098) | SECURITY IMPLEMENTATION FOR USER RESOURCE DISTRIBUTION | Concurrently herewith |
| 15/082,645 (now published as U.S. Pat. application Publication No. 2017/0280315) | SYSTEM FOR ADAPTATION MULTIPLE DIGITAL SIGNATURES IN A DISTRIBUTED NETWORK | Concurrently herewith |

The invention claimed is:

1. An intelligent resource procurement system, comprising:

a computer apparatus including a processor, a memory, and a network communication interface;

a resource management module stored in the memory, executable by the processor, and configured for:

identifying a resource deficiency associated with an entity, wherein the entity is a company;

establishing a secure communication channel with a portable electronic device of the entity;

monitoring a location of the portable electronic device over the secure communication channel;

receiving, via the network communication interface, a usage profile for each of a plurality of smart devices related to the resource deficiency;

parsing the usage profiles to extract aggregate usage information;

identifying a custodian of each of the plurality of smart devices, wherein a first custodian of a first smart device of the plurality of smart devices is identified by comparing (i) location information associated with the first custodian with (ii) location information associated with first smart device to determine that the first custodian is routinely located proximate to the first smart device;

determining that the portable electronic device is located proximate to (i) the first smart device of the plurality of smart devices and (ii) the first custodian of the first smart device, wherein the portable electronic device does not belong to the first custodian;

determining that the first custodian of the first smart device is a trusted custodian based on (i) determining a social network relationship between the first custodian of the first smart device and the entity and (ii) comparing (a) location information associated with the entity with (b) location information associated with the first custodian of the first smart device to determine that the first custodian is routinely located proximate to the entity; and based on determining that the portable electronic device is located proximate to (i) the first smart device and (ii) the first custodian of the first smart device and further based on determining that the first custodian of the first smart device is a trusted custodian, transmitting instructions over the secure communication channel to the portable electronic device, the instructions causing the portable electronic device to display resource procurement information related to the resource deficiency, the resource procurement information comprising the aggregate usage information, wherein the aggregate usage information comprises one or more population-wide metrics associated with a model of the first smart device.

2. The intelligent resource procurement system according to claim 1, wherein the resource management module is configured for:

receiving, via the network communication interface, a usage profile of a current smart device of the entity; and analyzing the usage profile of the current smart device to identify the resource deficiency.

3. The intelligent resource procurement system according to claim 2, wherein analyzing the usage profile of the current smart device to identify the resource deficiency comprises identifying data in the usage profile of the current smart device associated with a failure condition.

4. The intelligent resource procurement system according to claim 1, wherein the resource procurement information comprises a recommendation that the entity procure a new smart device.

5. The intelligent resource procurement system according to claim 4, wherein the new smart device and the plurality of smart devices are the same type of smart device.

6. The intelligent resource procurement system according to claim 1, wherein the instructions cause the portable electronic device to display a graphical user interface, the graphical user interface being configured to display a selectable offer to procure a new smart device.

7. The intelligent resource procurement system according to claim 6, wherein the resource management module is configured for:

receiving an acceptance of the offer from the portable electronic device; and procuring the new smart device for the entity.

8. A computer program product for providing intelligent resource procurement comprising a non-transitory computer-readable storage medium having computer-executable instructions for:

identifying a resource deficiency associated with an entity, wherein the entity is a company;

establishing a secure communication channel with a portable electronic device of the entity;

monitoring a location of the portable electronic device over the secure communication channel;

receiving, via a network communication interface, a usage profile for each of a plurality of smart devices related to the resource deficiency;

parsing the usage profiles to extract aggregate usage information;

identifying a custodian of each of the plurality of smart devices, wherein a first custodian of a first smart device of the plurality of smart devices is identified by comparing (i) location information associated with the first custodian with (ii) location information associated with first smart device to determine that the first custodian is routinely located proximate to the first smart device;

determining that the portable electronic device is located proximate to (i) the first smart device of the plurality of smart devices and (ii) the first custodian of the first smart device, wherein the portable electronic device does not belong to the first custodian;

determining that the first custodian of the first smart device is a trusted custodian based on (i) determining a social network relationship between the first custodian of the first smart device and the entity and (ii) comparing (a) location information associated with the entity with (b) location information associated with the first custodian of the first smart device to determine that the first custodian is routinely located proximate to the entity; and based on determining that the portable electronic device is located proximate to (i) the first smart device and (ii) the first custodian of the first smart device and further based on determining that the first custodian of the first smart device is a trusted custodian, transmitting instructions over the secure communication channel to the portable electronic device, the instructions causing the portable electronic device to display resource procurement information related to the resource deficiency, the resource procurement information comprising the aggregate usage information, wherein the aggregate usage information comprises one or more population-wide metrics associated with a model of the first smart device.

9. The computer program product according to claim 8, wherein the non-transitory computer-readable storage medium has computer-executable instructions for:
receiving, via the network communication interface, a usage profile of a current smart device of the entity; and
analyzing the usage profile of the current smart device to identify the resource deficiency.

10. The computer program product according to claim 9, wherein analyzing the usage profile of the current smart device to identify the resource deficiency comprises identifying data in the usage profile of the current smart device associated with a failure condition.

11. The computer program product according to claim 8, wherein the instructions cause the portable electronic device to display a graphical user interface, the graphical user interface being configured to display a selectable offer to procure a new smart device.

12. The computer program product according to claim 11, wherein the non-transitory computer-readable storage medium has computer-executable instructions for:
receiving an acceptance of the offer from the portable electronic device; and
procuring the new smart device for the entity.

13. A computerized method for providing intelligent resource procurement, comprising:
identifying, via a computer processor, a resource deficiency associated with an entity, wherein the entity is a company;
establishing, via a computer processor, a secure communication channel with a portable electronic device of the entity;
monitoring, via a computer processor, a location of the portable electronic device over the secure communication channel;
receiving, via a network communication interface, a usage profile for each of a plurality of smart devices related to the resource deficiency;
parsing, via a computer processor, the usage profiles to extract aggregate usage information;
identifying, via a computer processor, a custodian of each of the plurality of smart devices, wherein a first custodian of a first smart device of the plurality of smart devices is identified by comparing (i) location information associated with the first custodian with (ii) location information associated with first smart device to determine that the first custodian is routinely located proximate to the first smart device;
determining, via a computer processor, that the portable electronic device is located proximate to (i) the first smart device of the plurality of smart devices and (ii) the first custodian of the first smart device, wherein the portable electronic device does not belong to the first custodian;
determining, via a computer processor, that the first custodian of the first smart device is a trusted custodian based on (i) determining a social network relationship between the first custodian of the first smart device and the entity and (ii) comparing (a) location information associated with the entity with (b) location information associated with the first custodian of the first smart device to determine that the first custodian is routinely located proximate to the entity; and
based on determining that the portable electronic device is located proximate to (i) the first smart device and (ii) the first custodian of the first smart device and further based on determining that the first custodian of the first smart device is a trusted custodian, transmitting, via a computer processor, instructions over the secure communication channel to the portable electronic device, the instructions causing the portable electronic device to display resource procurement information related to the resource deficiency, the resource procurement information comprising the aggregate usage information, wherein the aggregate usage information comprises one or more population-wide metrics associated with a model of the first smart device.

14. The computer program product according to claim 8, wherein the resource procurement information comprises a recommendation that the entity procure a new smart device.

15. The computer program product according to claim 14, wherein the new smart device and the plurality of smart devices are the same type of smart device.

* * * * *